(12) United States Patent
Tanaka et al.

(10) Patent No.: US 9,711,113 B2
(45) Date of Patent: Jul. 18, 2017

(54) INFORMATION CODE, INFORMATION CODE PRODUCING METHOD, INFORMATION CODE READER, AND SYSTEM WHICH USES INFORMATION CODE

(71) Applicant: DENSO WAVE INCORPORATED, Chita-gun, Aichi-pref. (JP)

(72) Inventors: Masami Tanaka, Handa (JP); Takuya Yoda, Obu (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 14/654,207

(22) PCT Filed: Dec. 18, 2013

(86) PCT No.: PCT/JP2013/083901
§ 371 (c)(1),
(2) Date: Jun. 19, 2015

(87) PCT Pub. No.: WO2014/098128
PCT Pub. Date: Jun. 26, 2014

(65) Prior Publication Data
US 2015/0317955 A1    Nov. 5, 2015

(30) Foreign Application Priority Data

Dec. 19, 2012  (JP) ................................ 2012-276910
Sep. 20, 2013  (JP) ................................ 2013-195607

(51) Int. Cl.
*G06K 7/10*    (2006.01)
*G09G 5/37*    (2006.01)
(Continued)

(52) U.S. Cl.
CPC ................. *G09G 5/37* (2013.01); *G06K 1/12* (2013.01); *G06K 7/10722* (2013.01); *G06K 19/06112* (2013.01); *G09G 2380/04* (2013.01)

(58) Field of Classification Search
CPC ..... G06F 11/08; G06F 8/36; G06K 19/06112; G06K 1/12; G06K 7/10722; G09G 2380/04; G09G 5/37
(Continued)

(56) References Cited

U.S. PATENT DOCUMENTS 5,541,396 A      7/1996  Rentsch
6,655,579 B1 *  12/2003  Delman ........... G07B 17/00508
                                                        235/375
(Continued)

FOREIGN PATENT DOCUMENTS

EP      2515258 A1    10/2012
JP    2004-206674 A     7/2004
(Continued)

OTHER PUBLICATIONS

Oct. 28, 2015 Written Opinion issued in Singaporean Patent Application No. 11201504870W.
(Continued)

*Primary Examiner* — Seung Lee
(74) *Attorney, Agent, or Firm* — Oliff PLC

(57) ABSTRACT

A two-dimensional information code is provided. In the code area of this information code, there are formed a specification pattern region in which predetermined-shape specification patterns, such as position detecting patterns, are arranged, a data recording region in which data are recorded using plural types of cells, and an error-correction code recording region in which error correction codes are arranged using the plural types of cells. In the code area, a free space is formed at a position located outside the
(Continued)

specification pattern region, the data recording region, and the error-correction code recording region. Data are not recorded by cells in the free space and error correction on the error correction codes is not applied to the free space. The free space has a size larger in area than a single cell.

21 Claims, 12 Drawing Sheets

(51) Int. Cl.
*G06K 19/06* (2006.01)
*G06K 1/12* (2006.01)

(58) Field of Classification Search
USPC .................................. 235/454, 462.09, 494
See application file for complete search history.

(56) References Cited

U.S. PATENT DOCUMENTS

| | | |
|---|---|---|
| 7,412,106 B1 | 8/2008 | Nadabar et al. |
| 2007/0277150 A1 | 11/2007 | Oouchi |
| 2009/0242649 A1 | 10/2009 | Mizukoshi et al. |
| 2010/0044446 A1 | 2/2010 | Shah |
| 2010/0310161 A1 | 12/2010 | Horovitz et al. |
| 2012/0138695 A1 | 6/2012 | Mizukoshi et al. |
| 2016/0042262 A1* | 2/2016 | Tanaka .................. G06K 7/1417 235/494 |

FOREIGN PATENT DOCUMENTS

| | | |
|---|---|---|
| JP | 2007-241327 A | 9/2007 |
| JP | 2008-152334 A | 7/2008 |
| JP | 2009-129410 A | 6/2009 |
| JP | 2009-259192 A | 11/2009 |
| JP | 5057560 B2 | 10/2012 |
| WO | 2007/107533 A2 | 9/2007 |

OTHER PUBLICATIONS

Oct. 28, 2015 Search Report issued in Singaporean Patent Application No. 11201504870W.
Feb. 25, 2014 International Search Report issued in International Patent Application No. PCT/JP2013/083901.
Jul. 2, 2015 International Preliminary Report on Patentability issued in International Patent Application No. PCT/JP2013/083901.
"Information technology-automatic identification and data capture techniques-QR code 2005 bar code symbology specification;" International Standard ISO/IEC 18004; Second Edition; Sep. 1, 2006; Annex M.

* cited by examiner

FIG.10
(A) 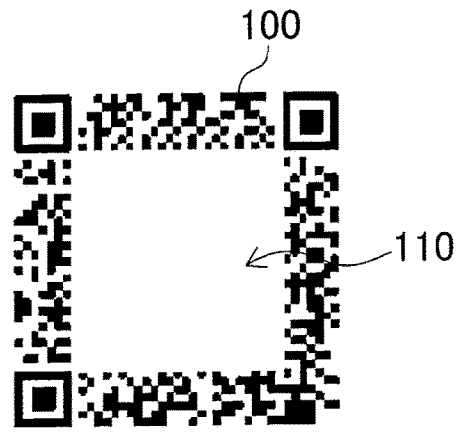
(B) 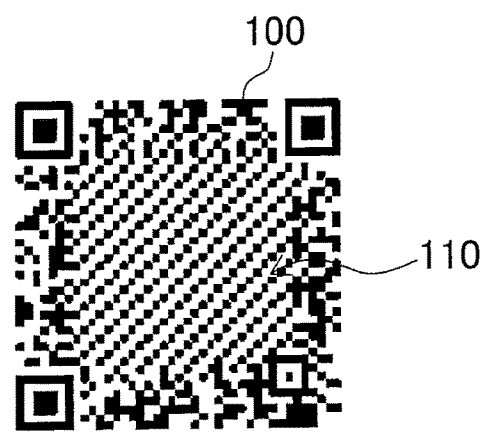
(C) 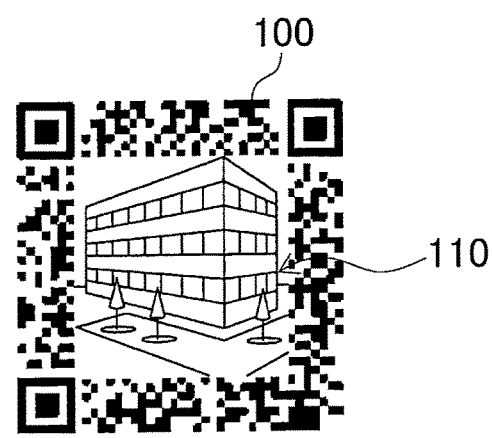

FIG.11
(A)
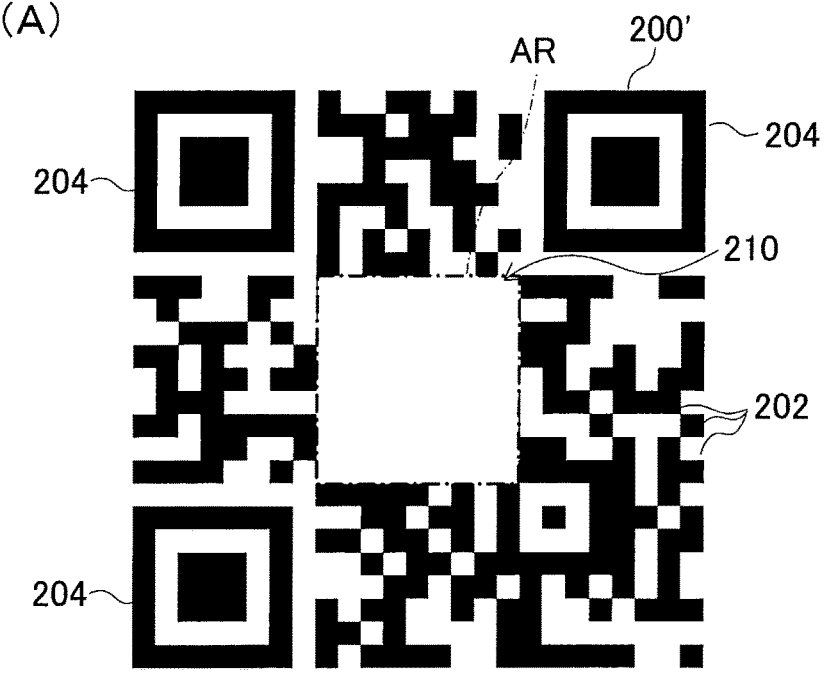
(B)
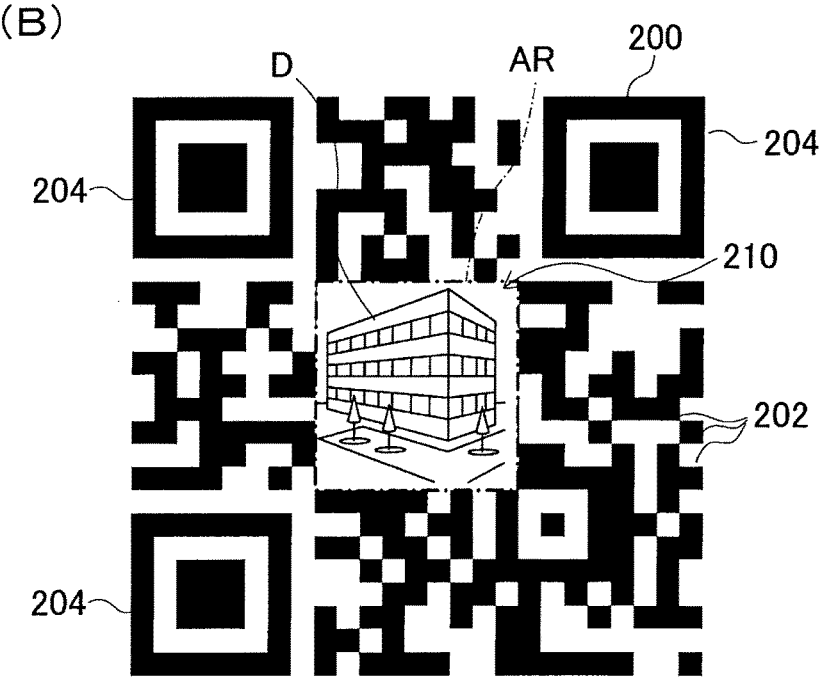

FIG.12
(A)
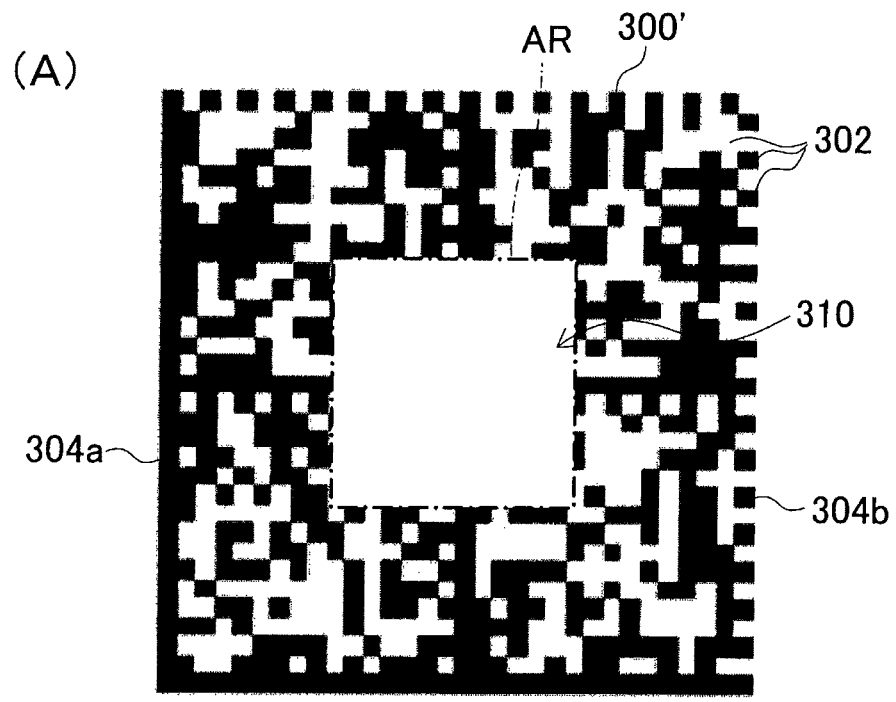
(B)
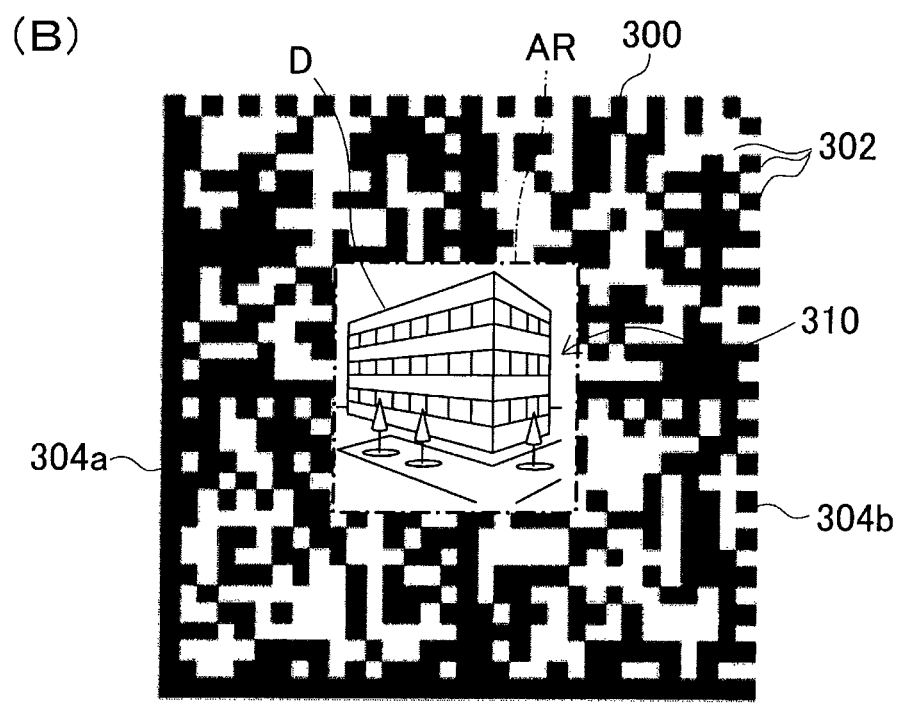

200
INFORMATION CODE, INFORMATION CODE PRODUCING METHOD, INFORMATION CODE READER, AND SYSTEM WHICH USES INFORMATION CODE

CROSS-REFERENCE TO RELATED APPLICATION

This application is based on and claims the benefit of priority from earlier Japanese Patent Application Nos. 2012-276910 filed on Dec. 19, 2012 and 2013-195607 filed on Sep. 20, 2013 the descriptions of which are incorporated herein by reference.

BACKGROUND

Technical Field

The present invention relates to information codes such as two-dimensional codes, a production method for producing the information code, a reader that reads the information code, and a system which uses the information code.

Background Art

Information codes such as two-dimensional codes have now been used in many applications. Such applications include an application in which a picture or a figure is arranged in the code area. For example, a technique provided by patent literature 1 is concerned with a two-dimensional code produced by strings of reverse-converted bits which are reversely converted from strings of bits. These strings of bits form a region of the code, in which the region is composed at a single gray level. The reverse-converted bit strings are converted based on information about a format for the two-dimensional code, thus producing a unique two-dimensional code with a design region composed of the single gray level.

CITATION LIST

Patent Literature

[PTL 1] JP Patent No. 5057560

Technical Problem

In the technique shown by the foregoing patent literature 1, if the unique two-dimensional code has a design region composed of white modules, given design data are combined with the unique two-dimensional code such that a design composed of gray levels which can be read as white is formed in the design region. In contrast, if the unique two-dimensional code has a design region composed of black modules, given design data are combined with the unique two-dimensional code such that a design composed of gray levels which can be read as black is formed in the design region.

However, the technique shown by the patent literature 1 is confronted with a problem that there are more restrictions for producing a design region in producing the code, due to conformity with error correction codes and setting the design code with more gray levels.

SUMMARY

Thus it is desired to provide the configuration with which a free space, which is different from the data recording region and a specification pattern region, can be secured more easily in the code area of the information code.

Solution to Problem

A first aspect of the present disclosure relates to a method of producing an information code by an information code producing apparatus, cells being arranged in a predetermined code area of a medium, the cells functioning as a unit of information when the information is provided. The method is characterized in that the method includes:

arranging, in the code area, a specification pattern region in which predetermined-shape specification patterns are arranged in the code area, the specification patterns including patterns indicating a position of the code area;

arranging, in the code area, a data recording region in which data is recorded by a plurality of types of the cells in the code area; and arranging a free space at a position located outside the specification pattern region in the code area, the free space having a size larger in area than a single cell, the free space being arranged using a method which is different from a method of recording the data into the data recording region, at least one of recording data and displaying a design being enabled in the free space.

A second aspect relates to an information code formed on a medium, cells being arranged in a predetermined code area of the medium, the cells functioning as a unit of information when the information is provided. The information code is characterized in that the code includes:

a specification pattern region is arranged in the code region, predetermined-shape specification patterns being arranged in the specification pattern region, the specification patterns including patterns indicating a position of the code area;

a data recording region is arranged in the code region, data being recorded in the data recording region by a plurality of types of the cells; and a free space is arranged at a position located outside the specification pattern region in the code area, the free space having a size larger in area than a single cell, the free space being arranged using a method which is different from a method of recording the data into the data recording region, at least one of recording data and displaying a design being enabled in the free space.

A third aspect relates to an information code reader, reading an information code provided on a medium, cells being arranged in a predetermined code area of the medium, the cells functioning as a unit of information when the information is provided. The reader is characterized in that:

the information code includes:

a specification pattern region arranged in the code area, predetermined-shape specification patterns being arranged in the specification pattern region, the specification patterns including patterns indicating a position of the code area;

a data recording region arranged in the code area, data being recorded by a plurality of types of the cells in the data recording region; and a free space arranged at a position located outside the specification pattern region in the code area, the free space having a size larger in area than a single cell, the free space being arranged using a method which is different from a method of recording the data into the data recording region, at least one of recording data and displaying a design being enabled in the free space.

The information code reader includes:

an imaging unit imaging the information code; and an interpreter interpreting the data recorded in the data recording region, based on contents recorded in the data recording region, when the information code is imaged by the imaging unit.

A fourth aspect relates to a system which uses an information code, including an information code producing apparatus producing an information code provided on a medium, cells being arranged in a predetermined code area of the medium, the cells functioning as a unit of information when the information is provided; and an information code reader reading the information code produced by the information code producing apparatus. The system is characterized in that the information code producing apparatus is configured to produce the information code such that the information code comprises a specification pattern region arranged in the code area, predetermined-shape specification patterns being arranged in the specification pattern region, the specification patterns including patterns indicating a position of the code area;

a data recording region arranged in the code area, data being recorded by a plurality of types of the cells in the data recording region; and a free space arranged at a position located outside the specification pattern region in the code area, the free space having a size larger in area than a single cell, the free space being arranged using a method which is different from a method of recording the data into the data recording region, at least one of recording data and displaying a design being enabled in the free space.

The information code reader includes an imaging unit imaging the information code produced by the information code producing apparatus, wherein the information code reader is configured to interpret the data recorded in the data recording region based on contents of the data recording region, when the imaging unit images the information code.

Advantageous Effects

According to the first aspect of the present disclosure, at a position located outside the specification pattern region inside the code area, a free space can be formed using a method which is different from that for recording data into the data recording region. Data can be recorded in the free space and/or designs can be displayed in the free space, thus raising convenience for users. Especially, using the method for recording data into the data recording region, at least one of data recording and display of designs can be realized in the free space. In configuration of the free space, it is therefore possible to reduce restrictions resulting from the data recording region as much as possible.

According to the second aspect of the present disclosure, at a position located outside the specification pattern region inside the code area, a free space can be formed using a method which is different from that for recording data into the data recording region. Data can be recorded in the free space and/or designs can be displayed in the free space, thus raising convenience for users. Especially, using the method for recording data into the data recording region, at least one of data recording and display of designs can be realized in the free space. In configuration of the free space, it is therefore possible to reduce restrictions resulting from the data recording region as much as possible.

In the third aspect of the present disclosure, there can be realized a reader capable of reading a distinguishing information code provided with the free space.

According to a fourth aspect of the present disclosure, at a position located outside the specification pattern region inside the code area, a free space can be formed using a method which is different from that for recording data into the data recording region. Data can be recorded in the free space and/or designs can be displayed in the free space, thus raising convenience for users. Especially, using the method for recording data into the data recording region, at least one of data recording and display of designs can be realized in the free space. In configuration of the free space, it is therefore possible to reduce restrictions resulting from the data recording region as much as possible.

BRIEF DESCRIPTION OF DRAWINGS

In the accompanying drawings:

FIG. 10 is an illustration exemplifying various types of information codes which can be used in the system using the information code shown in FIG. 1;

FIG. 11 is an illustration illustrating an information code usable in a system which uses an information code, according to a second embodiment, in which (A) of FIG. 11 shows a blank free space of the code and (B) of FIG. 11 shows the free space of the code which is mapped with a design; and FIG. 12 is an illustration illustrating an information code usable in the system using the information code according to a third embodiment, in which (A) of FIG. 12 shows a blank free space of the code and (B) of FIG. 12 shows the free space of the code which is mapped with a design

DESCRIPTION OF EMBODIMENTS

First Embodiment

Figure 1:
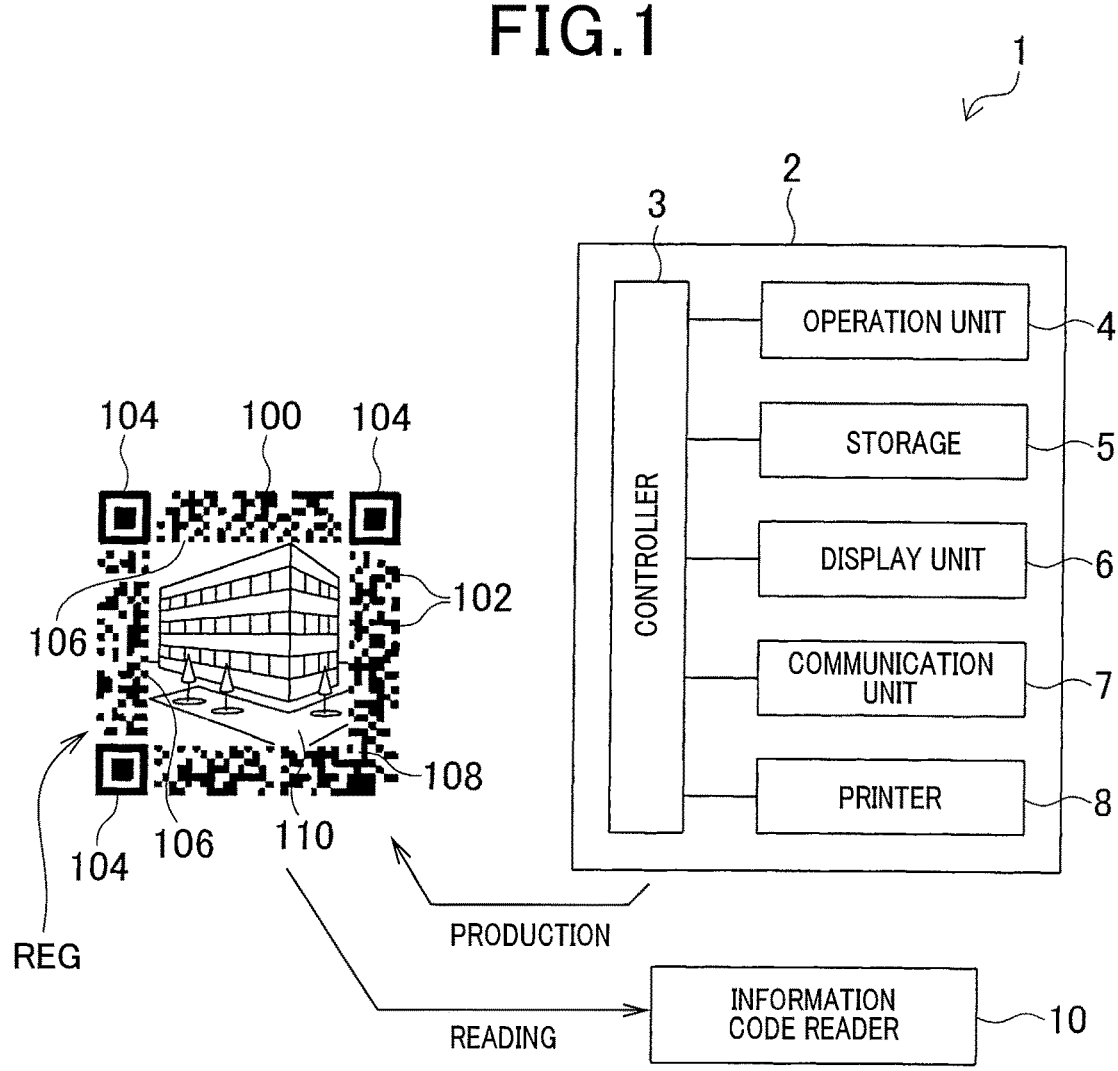
FIG. 1 is an outlined view exemplifying an outlined system using an information code, according to a first embodiment of the present invention.

Referring to the drawings, a first embodiment of the present invention will now be described.

FIG. 1 shows a system 1 which uses an information code. The system includes an information code producing apparatus 2 and an information code reader 10. The information code producing apparatus 2 produces an information code 100 provided with a predetermined code area in which cells are arranged, the cells being units composing information. The information code reader 10 reads the information code 100 produced by the information code producing apparatus 2.

(Information Code Producing Apparatus)

The information code producing apparatus 2 is configured by an information processing apparatus, which is a personal computer for example. This apparatus 2 is provided with a controller 3 including a CPU, an operation unit 4 including a key board, a mouse and other input devices, and a storage 5 including memory devices such as a ROM, a RAM, a HDD, and nonvolatile memories. The apparatus 2 further includes a display unit 6 equipped with known display devices (such as a liquid crystal display and/or other types of display devices), a communication unit 7 functioning as a communication interface to and from external devices via wired or wireless communication, and a printer 8 (printing device). The printer 8 is similar in hardware to known printers and is capable of printing the information code 100 and necessary information in reply to printing data sent from the controller 3.

(Information Code Reader)

Figure 2:
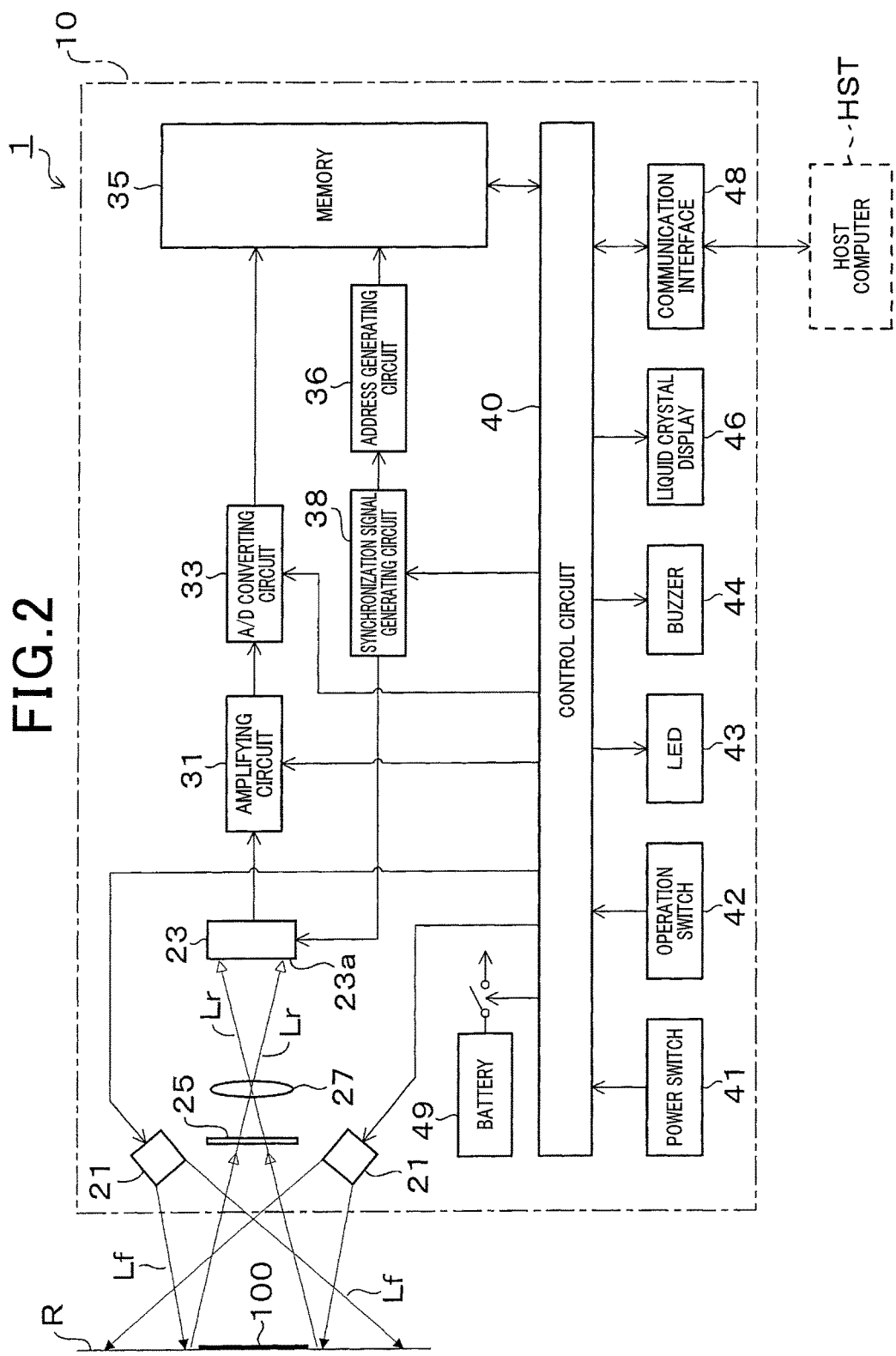
FIG. 2 is a block diagram exemplifying an outlined electric configuration of an information code reader composing part of the system using the information code shown in FIG. 1.

The whole configuration of the information code reader 10 will now be explained. As shown in FIG. 2, in terms of hardware configuration, the information code reader 10 is configured as a code reader capable of reading two-dimensional codes. The reader 10 has a not-shown outer casing, in which various kinds of electronic components are accommodated.

The information code reader 10 includes, as its main components, an optical system provided with illuminating sources 21, a light receiving sensor 23, a filer 25 and an imaging lens 27; a microcomputer system (hereinafter called "a microcomputer") provided with memories 35, a control circuit 40, an operation switch 42, and a liquid crystal display 46; and a power supply system provided with a power switch 41 and a battery 49. These components are mounted on not-shown printed boards and/or implemented in the case (not shown).

The optical system is configured to include the illuminating sources 21, light receiving sensor 23, filter 25 and imaging lens 27. The illuminating sources 21 function as light sources capable of emitting illuminating light Lf, and, for example, include red LEDs and lens systems disposed on the output side of the LEDs, in which the lens system include diffusing lenses and collecting lenses. In the present embodiment, the illuminating sources 21 are arranged on both sides of the light receiving sensor 23 and are able to emit the illuminating light Lf towards an object R being read via a reading opening (not shown) of the case. The object R being read is a medium carrying an information code or a medium in or on which an information code is arranged or mapped. The object R being read may be various objects such as resin materials or metal materials, and an information code 100 (later described), which are as shown in FIG. 1 for example, is produced on the object R being read, by printing or direct marking.

The light receiving sensor 23 is provided as one example of an imaging unit capable of imaging the information code 100 (which will be described later) and is able to receive reflected light Lr coming from the object R being read and the information code 100 which reflect the illuminating light. This light receiving sensor 23 is for example an area sensor in which light-receiving elements are arranged two-dimensionally, such elements being solid-state image sensing devices such as C-MOSs or CCDs. The light receiving sensor 23 is mounted on a not-shown printed circuit board and has a light receiving window 23a through which incident light arrives through the imaging lens 27, so that the sensor is able to receive the incident light.

The filter 25 is an optical low-pass filter disposed between the reading opening (not shown) of the case and the imaging lens 27. The filter 25 is able to, for example, allow to pass therethrough light whose wavelengths is equal to or less than a designated wavelength corresponding to the reflected light Lf and, in contrast, cut off light whose wavelength is over the designated wavelength. Hence unnecessary light components whose wavelengths are over that of the reflected light Lr are suppressed from incoming into the light receiving sensor 23. The imaging lens 27 is, by way of example, configured to include a lens barrel and a plurality of collecting lenses accommodated in the lens barrel. In the present embodiment, the imaging lens is configured to collect the reflected light Lr incoming through the reading opening (not shown) of the case, and form a code image of the information code 100 on the light receiving window 23a of the light receiving sensor 23.

The microcomputer system includes an amplifying circuit 31, an A/D converting circuit 33, a memory 35, an address generating circuit 36, a synchronization signal generating circuit 38, a control circuit 40, a power switch 42, an LED 43, a buzzer 44, a liquid crystal display 46, a communication interface 48, and other necessary components. In the microcomputer system, the control circuit 40 functioning as a microcomputer (i.e., information processing unit) and the memory 35 are key components in the function thereof, and image signals of the information code 100 imaged by the foregoing optical system can be processed.

An image signal (which is an analogue signal) outputted from the light receiving sensor 23 of the optical system is provided to the amplifying circuit 31 to be amplified there with a predetermined gain, and the amplified signal is then provided to the A/D converting circuit 33 to be converted to a digital signal from the analogue signal. The digitalized image signal, that is, image data (i.e., image information) is provided to the memory 35 so that the image data is stored in an image data storage area of the memory 35. The synchronization signal generating circuit 38 is configured to generate a synchronization signal sent to both the light receiving sensor 23 and the address generating circuit 36. The address generating circuit 36 is configured to generate addresses at which the image data are stored at the designated addresses in the memory 35, in response to the synchronization signal coming from the synchronization signal generating circuit 38.

The memory 35 is composed of memory devices such as semiconductor memory devices, which include RAMs (DRAMs, SRAMs, etc.) and ROMs (EPROMs, EEROMs, etc.). The RAMs of the memory 35 are arranged to provide not only the image data storage area, described above, but also an operation area and a reading condition table which are used during processing for arithmetic calculations and logic calculations performed by the control circuit 40. In the ROMs, system programs are stored in advance, which include predetermined programs assigned to a later-described reading process and other necessary programs, and which are used to control hardware components including the illuminating light sources 21 and the light receiving sensor 23.

The control circuit 40 is provided with a microcomputer configured to be able to control the information code reader 10, and the microcomputer includes a CPU, a system bus, and an input/output interface, whereby the microcomputer provides an information processing function. In the control circuit 40, the input/output interface is communicably connected to various input/output devices (called peripheral devices) which include, in the present embodiment, the power switch 41, the operation switch 42, the LED 43, the buzzer 44, the liquid crystal display 46 and the communication interface 48. The communication interface 48 is communicably connectable to the host computer HST and/or other systems which are provided as host systems of the information code reader 10.

The power system includes the power switch 41 and the battery 49, in which the power switch 41 can be turn on/off to control connection/disconnection of paths for drive voltage from the battery 49 to the foregoing devices and circuits, which is under control of the control circuit 40. The battery 49 is composed of a secondary battery capable of generating a predetermined DC voltage, and this battery is for example a lithium-ion battery.

(Information Code)

Figure 5:
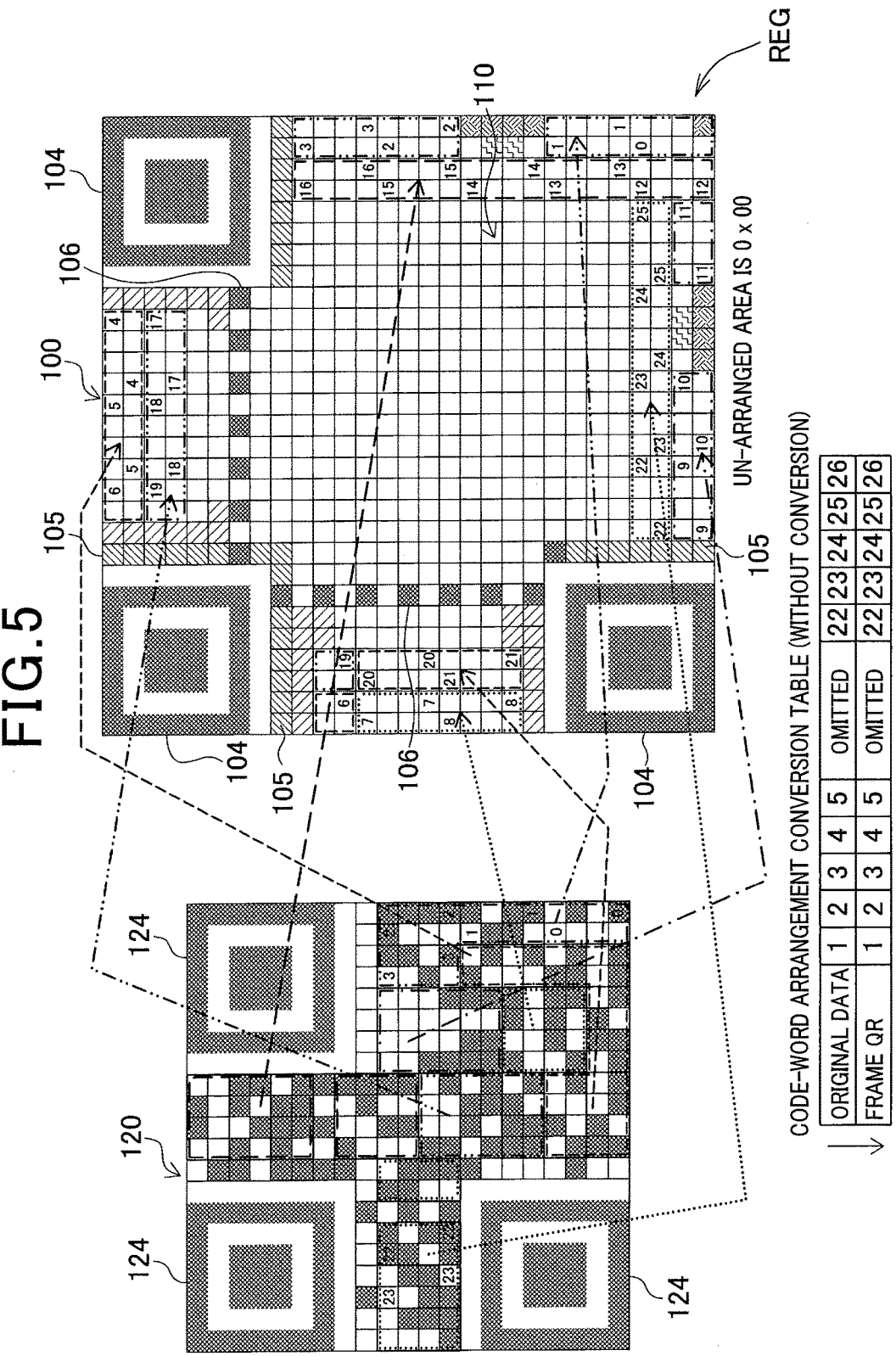
FIG. 5 is an illustration explaining a correspondence relationship between arrangement of respective data words in the information code produced by an information code producing apparatus composing part of the system which uses the information code shown in FIG. 1.

With reference to FIGS. 1, 5, and other drawings, an information code 100 used in the system which uses the information code shown in FIG. 1 will now be described. Two codes exemplified in FIGS. 1 and 5 are configured based on the same basic scheme for configuring the codes and have similar characteristics, although arrangement of cells and the sizes of specification patterns are different from each other in the two codes. An information code 100 shown in FIGS. 1, 5 and other drawings is produced by the foregoing information code producing apparatus 2, for example, and has a predetermined code area REG in which cells 102, each corresponding to a unit for displaying pieces of information, are arranged. In the information code 100 shown in FIGS. 1, 5 and other drawings, the "code area" is a rectangular region REG which can contain all of a plurality of dark cells (refer to FIGS. 1 and 5), and practically, is a minimum square or rectangular region which contains all of three position detecting patterns (finder patterns) 104.

Specifically the plurality of cells 102 are arranged or mapped according to a predetermined rule, so that the outer contours of some cells among those cells produce series of those contours which draw a square, rectangular, or other-shape area on or in a medium R differentially from the background. This area becomes the code area REG. Of course, when this information code is read, it is necessary that there is a quiet zone (margin) around the code area REG. The quiet zone should have a size corresponding to a given number or more of cells.

In the example shown in FIGS. 1, 5 and other drawings, each of the plurality of cells 102 is composed of a rectangular (e.g., square) light (e.g., white) cell or a rectangular dark (e.g., black) cell. Inside the code area, there is a free space (or called a canvas area) 110, which will be detailed later, and some of the cells 102 are located around the free space 110 in a matrix form. The terms "light color" and "dark color" of the light and dark cells are used herein to show representative colors which give a relative difference to luminance levels (i.e., contrast) when light reflects from the cells, so that the cells can be binarized to show a higher or lower luminance than a given threshold. Hence, it is not always confined to using the while and back cells. For example, the possibilities for light and dark colors are explained in detail by references such as "International Standard ISO/IEC18004, second edition 2006 Sep. 1, page 109, Annex M, "M1 Symbol contrast"".

In the information code 100, a light-color or dark-color margin zone is formed as a quiet zone to surround the code area. In the example shown in FIGS. 1, 5 and other drawings, a light-color margin zone is adjacent to surround the code area.

In the information code 100, there are provided a specification pattern region, a data recording region, and an error correction code recording region in its rectangular code (e.g., square, rectangular or any other shapes) code area. In the specification pattern region, predetermined-shaped specification patterns (practically, fixed-figure region wider in area than a single cell) are arranged. In the data recording region, data are recorded by the plurality of types of cells 102 and in the error correction code recording region, error correction codes are recorded by the plurality of types of cells 102. As shown in FIGS. 1, 5 and other drawings, by way of example, the specification patterns arranged in the information code 100 are the same in their shapes and positions as those of known predetermined models of a QR code (registered trademark) (in the example shown in FIG. 5, the predetermined models of the QR code standardized by JIS or other standards). In the example shown in FIGS. 1, 5 etc., three position detecting patterns (finder patterns) 104 are arranged at three corners of the code area respectively and, at predetermined positions, timing patterns 106 and alignment patterns 108 are arranged. The patterns 104, 106 and 108 serve as the specification patterns. The timing patterns and/or alignment patterns are not always necessary to be arranged.

In this way, at the predetermined positions in the code area of the information code 100, there are arranged the fixed-shaped specification patterns (i.e., the position detecting patterns 104, timing patterns 106 and alignment patterns 108 (omitted from FIG. 5). Inside the code area, a space other than the later-described free space 110 is used for arrangement of such specification patterns, recording regions (each of which is the recording region or the error correction code recording region), and other necessary regions.

The reader 10 may use many methods to interpret the number of lines and the number of columns, which are composed of cells, of the information code 100, the shapes and positions of the specification patterns, the position of format information, candidate positions of code words (i.e., addresses specifying the arrangement order of code words), and others. For example, a plurality of versions may be set depending on types of the information code 100, where, for each of the versions, the number of lines of cells and the number of columns of cells, the shapes and positions of the specification patterns, the positions of format information, and candidate positions (addresses) of code words may be predetermined. When version information is arranged at predetermined positions (reserved regions) in the code area, the reader 10 can read the version information at the predetermined positions. Based on this version information, the reader 10 can understand the number of lines of cells and the number of columns of cells, the shapes and positions of the specification patterns, the position of the format information, the candidate positions (addresses) of code words in the information code 100. The reader 10 may use an alternative approach to understand the foregoing pieces of information.

In addition, inside the code area, the free space 110 is formed to have a size larger than the size of the single cell 102. This free space 110 is located at a region other than the specification pattern regions, data recording region, and error correction code recording regions. In the free space 110, cells showing data being interpreted as output data for reading are not recorded. In other words, the free space 110 can be set as a region in which data on the cells 102 are not recorded and to which error correction on error correction codes are not applied. This free space 110 can be used to record data therein or draw designs therein by using a technique different from that for recording information on cells in the data recording region and the error correction code recording regions.

In the example shown in FIGS. 1, 5 etc., the data recording region and the error correction code recording regions are arranged along the inner ends of the code area so that such regions are located in a ring and rectangular shape, while the free space 110 is formed in a central part of the code area.

In the following, a representative example will be explained in which a code configuration assigned to a predetermined version drawn as the right figure in FIG. 5 is made to correspond to a code configuration assigned to a further version (i.e., version number) smaller than the predetermined version as the left figure in FIG. 5. Moreover, the positions of respective code words of the information code 100 drawn on the right side of FIG. 5 are made to correspond to the positions of respective code words of another type of code 120 drawn on the left side of FIG. 5 by an arrangement conversion table shown in the lower part of FIG. 5. In this example, as long as an amount of data can be stored in the other type of code 120 shown on the left side in FIG. 5, such data can expressed in a region which remains after formation of the free space 110 the information code 100 on the right side in FIG. 5. When the information code 100 on the right side of FIG. 5 is read, the code words of this information code 100 can be read such that they are code words of the other type of code 120 on the left side in FIG. 5.

On the right figure of FIG. 5, the regions of the respective code words, which are mapped around the free space 110, are conceptually shown by dashed line frames. Regions in which the format information (i.e., the cells at the predetermined positions 105) are conceptually shown by a predetermined type of hatched lines. The regions in which the format information or the code words are recorded are shown by only squares, omitting practical cell arrangements from being drawn. In addition, although the example shown on the right side in FIG. 5 provides the free space 110 located at the central part of the code area has squares drawn therein, the free space 110 can be configured freely, so that the free space 110 may be drawn with a design as shown in FIG. 1, with symbols and/or patterns, or with a blank (refer to (A) to (C) of FIG. 10). The free space 110 is formed to correspond to an arrangement of cells.

Figure 6:
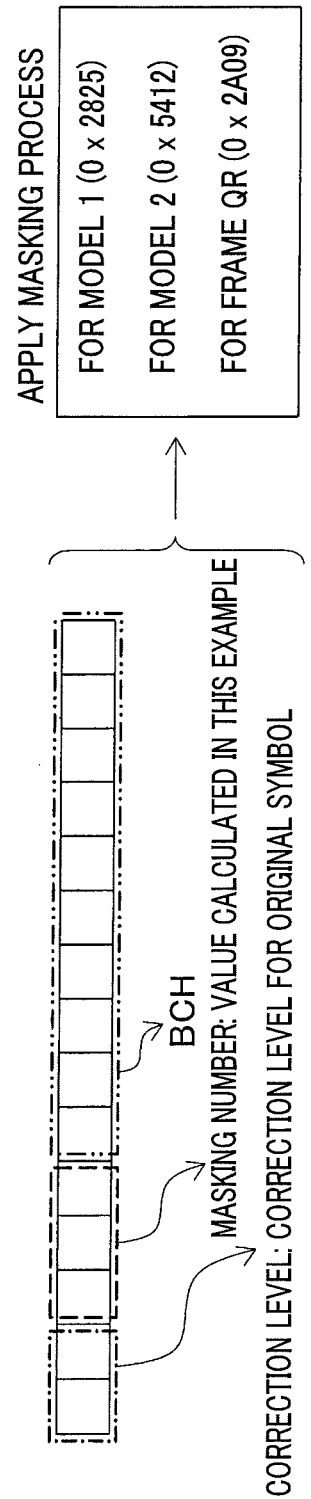
FIG. 6 is an illustration conceptually explaining the data format of the information code used in the system which uses the information code shown in FIG. 1.

The format information (type information) is configured as shown in FIG. 6 for example, and recorded at the predetermined positions 105 (portions with a predetermined type of hatched lines) in the information code 100. This recording is performed on a specified format configuration. This format information includes correction level information for specifying an error correction level and mask number information for specifying a mask number. The correction level information is to specify an error correction level used by the information code 100 and corresponds to an error correction level used by the other type of information code 120 when the information code 100 is converted to the other type of code 120 for reading thereof. The mask number is used to specify what type of masking has been applied to the code word region of the information code 100, where code words of data and an error correction are recorded in the code word region. Incidentally the correction level information and the mask information can be set by the same method as that used by the QR code (registered trademark), and may be set using other methods provided that the error correction level and the mask type can be specified by such other methods. The code word region of the information code 100 is masked by a known masking method specified by the foregoing mask number.

The format information shown in FIG. 6 is recorded so that a predetermined type of mask pattern (a specified mask) is reflected in the format information. That is, using a known masking method, the predetermined type of mask pattern is applied to arrangements of light and dark cells showing data corresponding to the format information. The type of mask indicated by the format information is identified by a method similar to a known QR code, thus making it possible to detect a specified code type as shown on the right side in FIG. 5 (i.e., a code type with the free space 110).

In the QR code (registered trademark) according to a known standard, when the QR code is configured on a model 1 for example, a mask for the model 1 is applied to the format information shown in FIG. 6, so that data (i.e., a cell arrangement) are produced by the masking and the produced data are recorded at predetermined positions. Similarly, in configuring the QR code on a model 2, a mask for the model 2 is applied to the format information shown in FIG. 6, so that data (i.e., a cell arrangement) are produced by the masking and the produced data are recorded at predetermined positions.

Meanwhile, in the information code 100 shown in FIG. 5 of the present embodiment (that is, in the special type of code with the free space 110), a specified mask which is different in type from the models 1 and 2 is applied to the format information shown in FIG. 6. This application produces an expression of data (i.e., an arrangement of cells), and the data are recorded in predetermined positions 105. In this example, the specified mask is exemplified as being for a casing trim QR (quick response) (or frame QR) in FIG. 6 and the frame QR is one kind of the two-dimensional code.

For any type selected from the models 1 and 2 on a known standard and the information code 100, the formal information is configured such that check digits for a correction level (correction level information) for recording and a mask number are included in the format information, and making for the selected type is then applied to the format information. Practically, the mask pattern for each type is used to be subjected to the format information using a known masking process, resulting in that an arrangement of light cells and dark cells, corresponding to a masked bit pattern, is recorded at the predetermined positions 105.

Accordingly, when the format information is masked by a specified mask (in FIG. 6, this specified mask is exemplified as being for the fame QR) and recorded at the predetermined positions 105, the cell information recorded at the predetermined positions 105 is released from being masked by using the specified mask and then interpreted for revealing the same check digits. Thus it can be determined that the type is for the information code 100.

In contrast, if the cell data at the predetermined positions in the information code 100 are un-masked based on the masks for the model 1 or 2, the check digits are produced differently from the originally added check digits. It can thus be determined that an information code is not according to the known models 1 and 2.

In this information code 100, the specification patterns (such as the position detecting patterns 104) are detected, and the same method as that for known QR codes is used to specify the direction of the code and the positions of the respective cells, before the format information recorded at the predestined positions are interpreted using the same method as that for the known QR codes. The type of a mask which has been disclosed through the interpretation provides the type of the information code 100, i.e., the type of this code is a special type with the free space 110. The interpreted format information results in determining both an error correction level used in the information code 100 and the type of a mask applied to the code word region (i.e., a region in which data code words and error correction code words are recorded). In addition, for example, the predetermined positions 105 of the code are previously understood by the reader 10.

Figure 3:
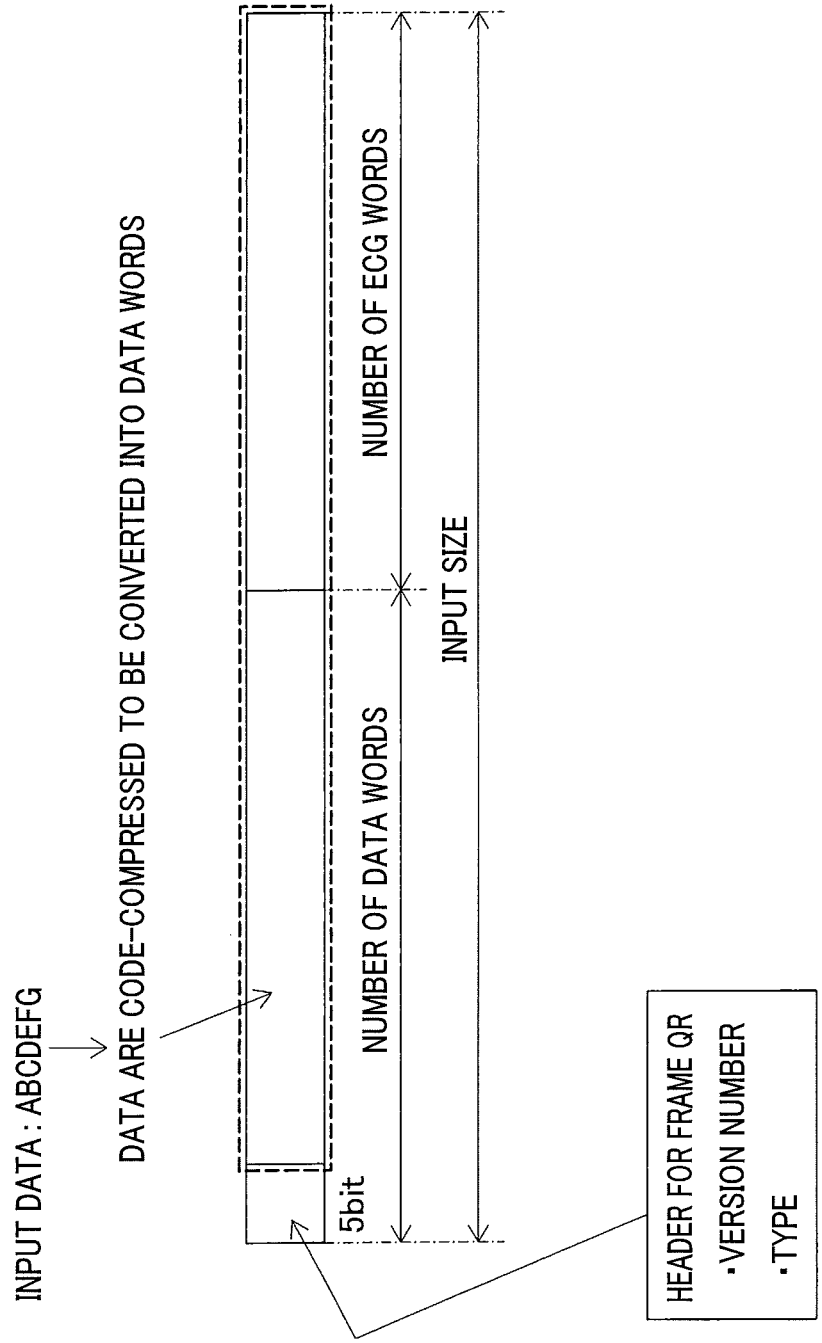
FIG. 3 is an illustration conceptually explaining the data configuration of an information code used in the system using the information code shown in FIG. 1.

Contents recorded in the information code 100 are formatted into a data arrangement as shown in FIG. 3, for example. Header data are put at the head of the data arrangement, which are followed by input data (i.e., data to be interpreted). In the example shown in FIG. 3, the input data (data to be interpreted) are compressed using a known compressing technique so that the input data are converted into data words (or data code words). This compression may be omitted, if it is unnecessary. The header data used in this information code 100 are also called "header for frame QR" in the following explanation. Further, in the present disclosure, the data recording region is composed of regions in which the data words (data code words) of the header data and the input data as well as regions in which the forgoing format information is recorded. In the example shown in FIG. 3, there are recorded, as the header data (the header for the fame QR), not only specifying information but also identifying information are recorded. The specifying information, which is exemplified as being the version number in FIG. 3, is able to specify the type (version) of the other type of code 120 later described. This other type of code 120 is a code type for interpreting the information code 100 and made to correspond to the information code 100 via the arrangement conversion table (shown in FIG. 5). The identifying information is used to identify a format in the free space.

Furthermore, the input data (i.e., data words being interpreted) are followed by error correction code words (ECC words) which are error correction codes. In the information code 100, a region in which the error correction codes are recorded functions as an error correction code recording region. As a method of producing error correction codes (i.e., error correction code words) based on the data words (i.e., the header data and the input data (which are data to be interpreted) in the example shown in FIG. 3), methods based on known two-dimensional codes (such as QR codes) can be employed. By way of example, as a method of producing the error correction code words based on the data words (i.e., data code words), a production method for error correction code words regulated by JISX0510:2004 (, which is JISX0510:2004, 8.5 error correction) can be used as one of known methods. This production method for the error correction code words is not limited to the foregoing, and this production may be performed using various other methods.

Moreover, in the information code 100, the respective data words (data code words) expressing data being interpreted (object data to be outputted) and the error correction code words are arranged or mapped within the code area on the basis of predetermined arrangement position information. In this configuration, as shown in FIG. 5, arrangement candidate positions for respective code words are defined previously in the code area of the information code 100, and the numbers (addresses) are assigned to the respective arrangement candidate positions. The arrangement position information specifies arrangement of the code words such that the respective code words composing the recording contents shown in FIG. 3 should be arranged at which of the arrangement candidate positions. In the example shown on the right figure in FIG. 5, the arrangement candidate positions Nos. 1-25 are outlined by way of example, in which the head and last bit portions are numbered for explicit showing in each of the arrangement candidate positions and arrangement candidate positions of Nos. 26 or higher are omitted from being drawn.

Specifically, in the case of the version of the other type of code 120 (in this case, a known QR code) where the version is specified by the header data shown in FIG. 3, known regulations or rules are applied to determine that each of the code words having an arrangement order should be arranged or mapped at which position in the other type of code 120. In interpreting the other type of code 120, the arrangements defined in this way are used to interpret the code words in the arrangement order. For instance, in the other type of code 120 shown on the left side in FIG. 5, the zero-th code word is arranged at the lower right, the first code word is arranged next to the upper edge of the zero-th code word, and the second code word is arranged next to the upper edge of the first code word. In this way, the arrangement positions of the respective code words are decided previously. The other type of code 120 is thus interpreted in sequence based on the predetermined arrangements, like the order starting from the zero-th code word, the first code word, the second code word, the third code word, . . . , and to the last one.

The arrangement position information (the arrangement conversion table) shown in FIG. 5 is provided to make the numbers of the respective arrangement positions (i.e., arrangement positions of the code words according to the arrangement order) previously decided in the other type of code 120 correspond to the numbers of the candidate positions (i.e., the arrangement candidate positions of the code words) previously decided in the information code 100, respectively. To be more precise, in the arrangement position information, correspondence information showing "the arrangement position of the first code word in the other type of code 120 corresponds to the first arrangement candidate position in the information code 100", "the arrangement position of the second code word in the other type of code 120 corresponds to the second arrangement candidate position in the information code 100", "the arrangement position of the third code word in the other type of code 120 corresponds to the third arrangement candidate position in the information code 100", and so on, is recorded as, for example, table data. As a result, the arrangement positions of the code words numbered in the other type of code 120 are made to respectively correspond to the arrangement candidate positions of the information code 100.

Thus, in interpreting the information code 100, the code words at the arrangement candidate positions in the code area, i.e., the addressed code words in the code area, are re-arranged to arrangement positions in the other type of code 120 which arrangement positions are specified by the arrangement position information (i.e., the arrangement conversion table). The other type of code 120 thus re-arranged is then subjected to interpretation based on a known interpretation method (e.g., a known decoding method for the QR code).

For example, by using the arrangement conversion table shown FIG. 5 to interpret the information code 100, the code word at the first arrangement candidate position in the information code 100 is arranged at an arrangement position assigned to the first code word in the other type of code 120; the code word at the second arrangement candidate position in the information code 100 is arranged at an arrangement position assigned to the second code word in the other type of code 120; and the code word at the N-th arrangement candidate position in the information code 100 is arranged at an arrangement position assigned to the M-th code word made to correspond to the N-th arrangement candidate position in the other type of code 120. As exemplified above, the re-arrangement is performed for every code word, and the other type of code (e.g., QR code) whose code words are re-arranged is subject to a known interpretation method.

It is preferable that the arrangement position information (the arrangement conversion table) is owned, as common data (a common arrangement conversion table), by both the information code producing apparatus 2 producing the information code 100 and the information code reader 10 reading the information code 100.

(Production Process of Information Code)

Figure 8:
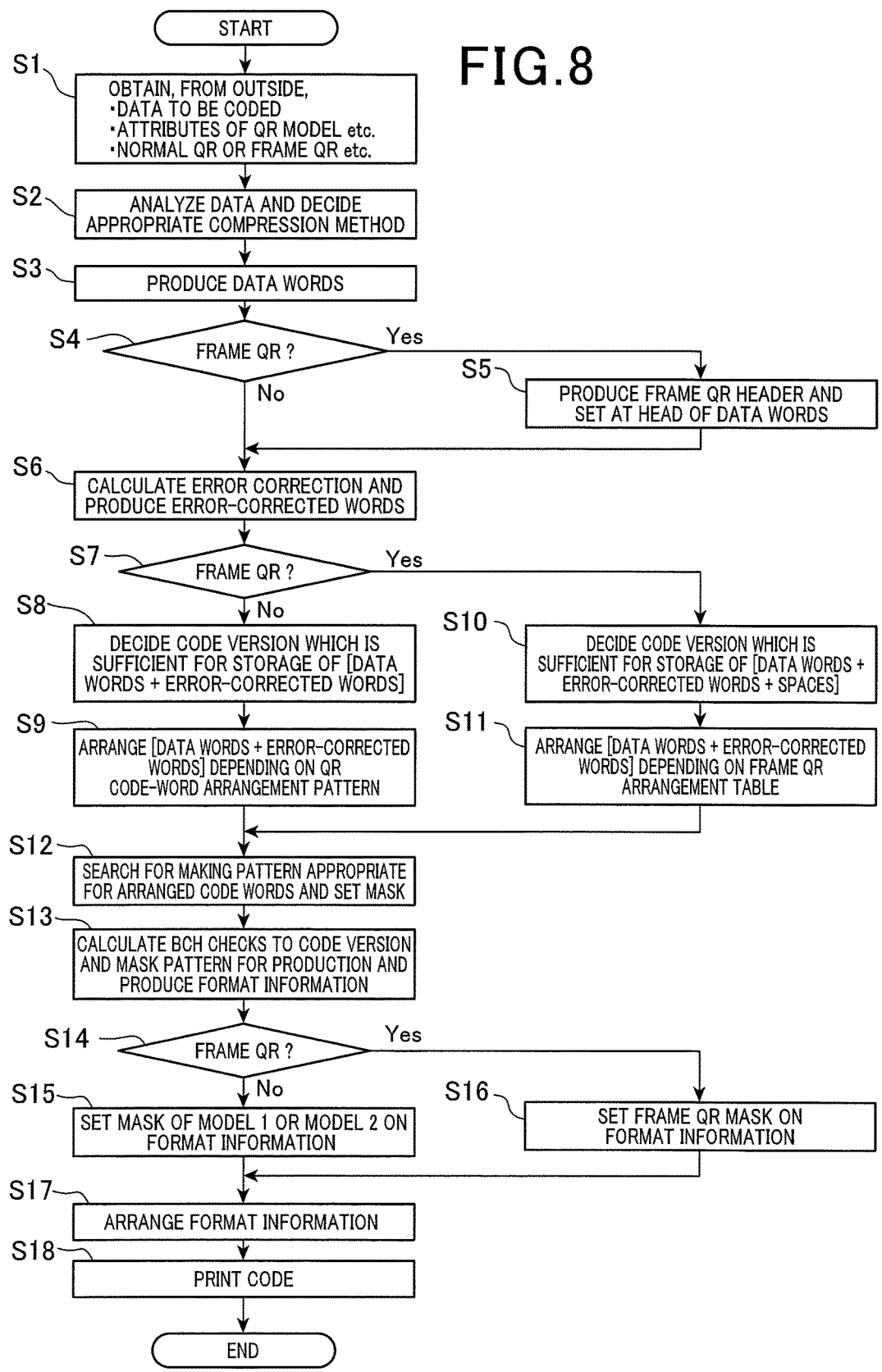
FIG. 8 is a flowchart exemplifying a flow of production of the information code produced by the information code producing apparatus composing the part of the system using the information code shown in FIG. 1.

Referring to FIG. 8 and other drawings, an information code producing process and an information code producing method will now be described.

The following description is directed to a QR code (registered trademark) exemplified as the other type of code 120 and the information code 100 has the specification patterns which are the same as those of the QR code, as shown in FIG. 5. In this example, the information code 100 with the free space 110 is also referred to as a "frame QR". Steps composing a process for the production are shown by adding a reference numeral "S".

An information code producing process is shown in FIG. 8, which is performed by the information code producing apparatus 2. This process is started, for example, by a predetermined operation performed at the operation unit 4. This process starts by obtaining from the outside data to be coded (i.e., object data being interpreted), attribute data, and code type data (showing data used for determining whether the information code 100 is produced or a general two-dimensional code (e.g., a general QR code) is produced) (S1). In the present configuration, the controller 3 and the operation unit 4 functionally correspond to one example of a data acquisition section which acquires object data to be interpreted (i.e., data inputted from the outside). Besides this example, another example is that the controller 3 and the communication unit 7 may be configured functionally as a data acquisition section which acquires, as object data being interpreted, input data from the outside via communication After acquisition of the object data at S1, a method for compressing the acquired object data is decided from known methods (S2). Data (i.e., object data to be interpreted, which are inputted data which have been compressed, are then expressed as a plurality of data words (data code words) (S3). It is then determined whether or not the code type data acquired at S1 is the type of the information code 100 with the free space 110 (frame QR) (S4). If the code type data acquired at S1 is the type of the information code 100 (frame QR) with the free space 110, the processing proceeds to a step S5 from Yes from S4. At step S5, header data inherently used by the type of information code 100 with the free space 110 (frame QR) is produced as described, and set at the head of data arrangement including a plurality of code words as shown in FIG. 3. Therefore, in the header data of FIG. 3, information (such as information of a version number) which is capable of specifying the type (version and format) of the other type of code 120 is recorded. Meanwhile, when the code type data acquired S1 does not show the type of the information code 100 with the free space 110 (frame QR), that is, the code type data are data indicating a known two-dimensional code assigned to, for example, the model 1 or the model 2, the processing proceeds along No from step S4.

In the case of No at step S4, error correction codes are produced by applying a known method to the data words (data code words) produced at S3, so that a plurality of error correction words (error correction code words) expressing error correction codes are produced (S6). When the processing has proceeded via steps S4 and S5, the configuration of the data words (i.e., plural data code words expressing the header data and the input data) produced at S3 and S5 is subjected to a known method to produce error correction codes, and a plurality of error correction words (error correction code words) expressing the error correction codes are produced (S6).

After step S6, it is again determined whether or not the code type data acquired at S1 is the type of the information code 100 with the free space 110 (frame QR) (S7). If the code type data does not show such information code 100, the processing proceeds to S8 from No at S7. In this case, the version of a two-dimensional code whose size is sufficient for storing both the data words (data code words) produced at S3 and the error correction codes (error correction code words) produced at S6 is decided. The version decided at this step should be a version selected among standardized plural versions of known QR codes and formed to have a storage size sufficient for the data words produced at S3 and the error correction words produced at S6. According to an arrangement pattern specified by the decided version, the data words produced at S3 and the error correction words produced at S6 are then arranged (or mapped) (S9).

On the other hand, when the code type data show the type of the information code 100 with the free space 110 (i.e., QR code), the processing proceeds S10 via Yes at S7. The version of a two-dimensional code (in the example shown in FIGS. 5 and 8, a QR code) is decided. This version should be a version providing a storage size sufficiently storing the data words (data code words) produced at S3 and S5 and the error correction words (error correction code words) produced at S6, and a free space. The free space may have a predetermined certain size or a size specified by a user's input or any other means at a stage provided before the step S10. The size of the free space may be designated by the numbers of lines and columns or may be given by data which is set to correspond to the number of words.

In the example shown in FIGS. 5 and 8, the version is decided among the plural versions (sizes) decided depending on the type of the information code 100. This version has a size capable of storing the data words (data code words) produced at S3 and S5, the error correction words (error correction code words) produced at S6, and the free space. By way of example, if there are a plurality of such versions which enable storage such data words and the free space, the system may select a version having the smallest storage size, or alternatively, the system may allow a user to designate any one version among the candidate versions.

In producing the information code 100, the specified size (the number of lines and the number of columns), arrangement of specification patterns, and candidate positions for the code words, which are decided by the version, are used. A practical code-word arrangement order of the code words is decided according to the foregoing arrangement conversion table. In the following, an example is explained in detail, in which the version showing the right figure in FIG. 5 is decided through the process at step S10.

At step S11 following S10, the data words (data code words) produced at S3 and S5 and the error correction words (error correction code words) produced at S6 are arranged in accordance with the foregoing arrangement position information (i.e., the arrangement conversion table). This arrangement conversion table is stored in the storage 5 of the information code producing apparatus 2 and set such that arrangement positions (arrangement positions of code words having an arrangement order) specified by the other type of code 120 correspond respectively to predetermined candidate positions (arrangement candidate positions of the respective code words) in the information code 100. At step S11, the arrangement positions of the code words to be recorded (i.e., the data words produced at S3 and S5 and the error correction words produced at S6) are specified as arrangement positions of respective code words having an arrangement order and being expressed in the other type of code 120 shown in FIG. 4 and the left figure in FIG. 5. This other type of code 120 is a two-dimensional code having a size smaller in area than the information code 100 but sufficient for storing the data words produced at S3 and S5 and the error correction words produced at S6. After specifying the arrangement positions, those code words are arranged or mapped at the respective arrangement candidate positions in the information code 100, which positions are made by the arrangement position information (the arrangement conversion table) to correspond to the respective code words having the arrangement order.

For example, in the arrangement position information (the arrangement conversion table shown in FIG. 5, the arrangement position of the first code word in the other type of code 120 and the first arrangement candidate position of the information code 100 are made to correspond to each other. Hence, the first code word among all the code words (i.e., the data words produced at S3 and S5 and the error correction words produced at S6) is arranged at the first arrangement candidate position in the information code 100. Similarly, the arrangement position of the second code word in the other type of code 120 and the second arrangement candidate position in the information code 100 are made to correspond to each other, whereby the second code word is arranged at the second arrangement candidate position in the information code 100. The arrangement position of the N-th code word in the other type of code 120 is made to correspond to the M-th arrangement candidate position of the information code 100. Accordingly, the N-th code word is arranged at the M-th arrangement candidate position in the information code 100.

In a case where only code words composed of the data words produced at S3 and S5 and the error correction words produced at S6 are arranged, the other type of code 120 (a known QR code) whose size is smaller than that of the information code 100 can still afford the expression of such cord words. However, when storing the data words produced at S3 and S5, the error correction words produced at S6, and the free space 110, the information code 100 is necessary which has a larger size. Hence, in the present embodiment, the data words produced at S3 and S5, the error correction words produced at S6, and the free space 110 are expressed by the information code 100, in which arrangement positions of the data words produced at S3 and S6 and the error correction words produced at S6 are decided between the arrangement positions of code words in the other type or code 120 (a known QR code) and those in the information code 100 using the arrangement conversion table.

In the present configuration, the arrangement conversion table shown in FIG. 5 exemplifies arrangement position information used to specify arrangement positions in the code area, at which plural data words expressing object data being interpreted are arranged the arrangement positions. This arrangement conversion table (i.e., the arrangement position information) is configured to provide correspondence information between the order of plural data words expressing object data to be interpreted and arrangement positions of data words to be arranged in the order in the code area. The storage 5 exemplifies an arrangement position information storage in which data of the arrangement conversion table (arrangement position information) are recorded.

After steps S9 or S11, a mask pattern which should be applied to the code words of which arrangement positions are decided at S9 or S11 is designated by a known predetermined method (e.g., a known method used by the QR code) and the designated mask pattern is applied to the code words (S12). Hence the mask pattern is reflected on the code words of which arrangement positions are decided at S9 or S11. Based on information (mask number) showing the mask pattern which has been set step S12 and information showing the error correction level, check digits are calculated, and format information including the error correction level, the mask number, and the check digits is produced (S13).

When the code type data acquired at S1 shows the information code 100 with the free space 110 (i.e., the frame QR), the process proceeds along a route Yes at step S14. Hence, a masking process is performed so that the foregoing designated mask (a mask for the frame QR) is reflected in the format information produced at S13 (refer to FIG. 6) (S16). Meanwhile when the code type data acquired at S1 does not show the information code 100 with the free space 110 (i.e., the frame QR), the process proceeds along a route No at step S14. In this case, a mask (e.g., a mask for the model 1 or 2), whose mask pattern is different from the mask pattern set S16, is set and applied to the format information (S15). After masking the format information at S15 or S16, the masked format information is arranged at the predetermined positions in the code area (for example, the predetermined positions 105 of the information code 100 as shown in FIG. 5) (S17). In this way, the information code 100 or the other type of code 120 is produced, and the code is printed by the printer 8 (S18). At step S18, in place of the printing, such a produced code may be displayed using the display unit or transmitted as data of the information code 100 to an apparatus placed outside the system.

In the present embodiment, the controller 3 of the information code producing apparatus 2 exemplifies the data-recording region producing section. Thus, for the code area with the free space 110, the data recording region is produced such that the format information is recorded at the predetermined positions of the code area in the specified format configuration and the data expressing the object data being interpreted (i.e., the input data) acquired by the data acquiring section are arranged according to the arrangement position information stored in the arrangement-position information recording section. Furthermore, in the data-recording-region producing section, composed by the controller 3, for the code area with the free space 110, the cells are arranged at the predetermined positions 105 in a state where the predetermined type of mask pattern (the designated mask) has been reflected in the cells.

Figure 4:
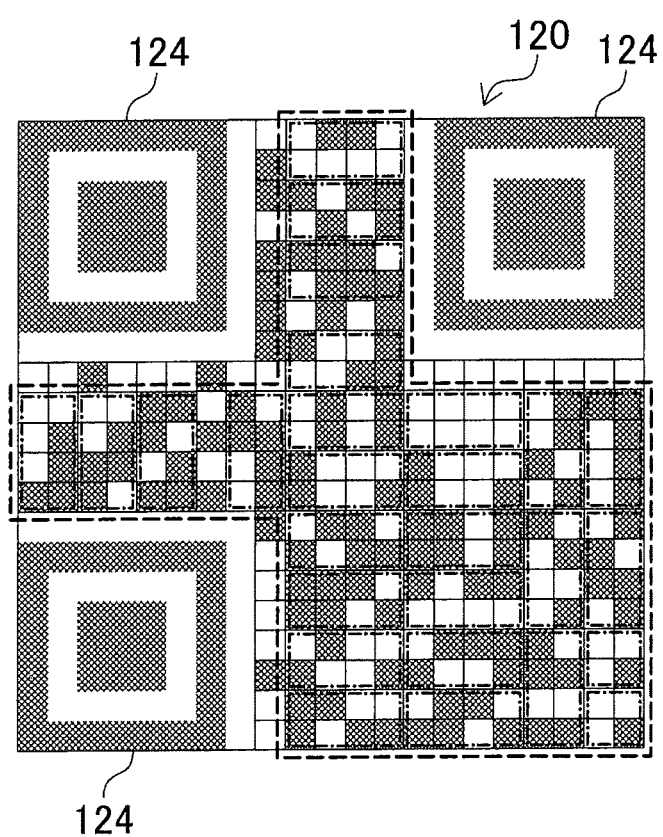
FIG. 4 is an illustration explaining another type of code corresponding to the information code used in the system using the information code shown in FIG. 1.

Furthermore, in FIGS. 4 and 5, the other type of code 120 has, at its three corners, position detecting patterns 124 which are produced automatically and which correspond to the position detecting patterns 104 of the information code 100

(Reading Process of Information Code)

A reading process for the information code 100 shown in FIG. 1 and on the right side in FIG. 1 will now be described, which process is performed by the information code reader 10 shown in FIG. 2. The steps shown in this reading process are abbreviated by a symbol "S."

Figure 9:
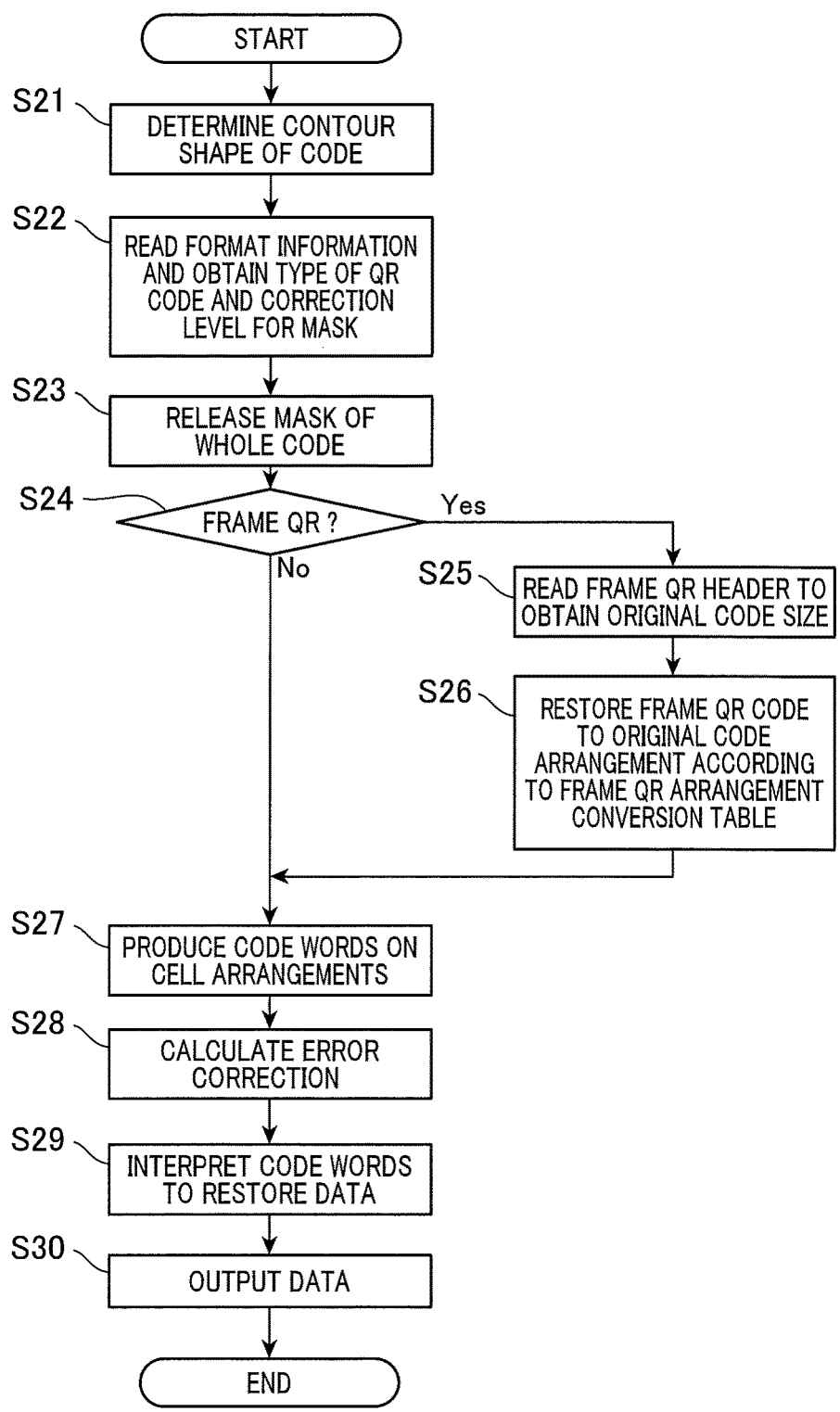
FIG. 9 is a flowchart exemplifying a flow of reading the information code produced by the information code producing apparatus composing the part of the system using the information code shown in FIG. 1.

The reading process shown in FIG. 9 is performed when, for example, a user performs a given operation (for example, at the operation switch 42). As shown at S21 in FIG. 9, the information code 100 is imaged to obtain an image of this information code 100, and the outer shape of the code 100 is detected. Practically this detection is carried out such that the position detecting patterns 104 is first detected using a known method (i.e., a known method used in reading the QR code), and the code 100 is then subjected to detection of its outer shape using a known method in reading the QR code. In this embodiment, the light receiving sensor 23 corresponds to an imaging unit, which functions as a device to image the information code 100 produced by the information code producing apparatus 2.

The step S21 is followed by interpreting information (format information) mapped at the predetermined positions of the information code 100 such that the type of the code 100 and a masking correction level are obtained (S22). As described, if check digits coincide with each other when the information recorded at the predetermined positions 105 has been interpreted after unmasking the format information using the foregoing designated mask (a mask for the frame QR), it can be determined that this type of code is an information code 100 with a free space 110. It is therefore possible to acquire an error correction level and a mask number included in the format information.

Using the mask number included in the format information obtained at S22, the whole code (specifically, the code word regions) is removed from being masked (S23). When an object being read is such an information code 100 with the free space 110 (i.e., the mask removal has succeeded by the foregoing designated mask (the mask for the frame QR), the processing proceeds along a path, Yes, from step S24 to steps S24 and S25. Interpreting the header data arranged at the head of the data words (the frame QR header, refer to FIG. 3) makes it possible to specify an original code size (i.e., the version of the other type of code 120) (S25). Furthermore, using an arrangement conversion table corresponding to that shown in FIG. 5 makes it possible to return the information code 100 shown on the right side in FIG. 5 to the original code (i.e., the other type of code 120) shown on the left side in FIG. 5 (S26). To be specific, the code words arranged at the arrangement candidate positions in the information code 100 are re-arranged at arrangement positions in the other type of code 120, which arrangement positions are made to correspond to the respective arrangement candidate positions in the arrangement conversion table.

If the determination is No at S24 and the processing at S26 has finished, recorded code words are specified and produced based on the cell arrangements (S27), i.e., cell arrangements of the QR code being read when the determination is No at S24 and cell arrangements of the other type of code 120 arranged at S26 when the processing proceeds from S26 to S27.

A known technique is then applied to error correction code words recorded in the error correction code recording region so as to calculate error correction, and the code words in the data recording region are interpreted (S29). The data (data being interpreted) at S29 are then displayed by the display and/or outputted via data transmission and/or printing (S30). Alternatively, in the step S30, the data interpreted at step S29 may be outputted as they are or after being processed by other data processing techniques.

In the present embodiment, the control circuit 40 is exemplified as a determination device. When the imaging unit captures an image of the information code 100, this determination section determines whether or not the predetermined positions 105 of the code area have a specified format configuration. Concretely, the determination section determines whether or not a predetermined type of mask pattern is reflected at the predetermined positions 105.

The control circuit 40 also serves as an interpretation device, so that, when the imaging unit images the information code 100, the interpretation section interprets data recorded in the data recording region based on the contents of both the data recoding region and the error correction code recording region. In other words, in cases where it is determined by the determination section that the predetermined positions are configured in a specified format (specifically, a predetermined type of mask pattern is reflected at the predetermined positions), correspondence information (i.e., the arrangement conversation table) recorded in the correspondence information recording section is used to specify positions of the respective data words in the code area. Hence, the object data are interpreted.

The arrangement conversion table is one example of the correspondence information, in which the data words expressed in sequence with the arrangement positions in the code area are defined as corresponding positions in the other type of code 120 when the data words are expressed by a predetermined method (for example, a known standard) in the other type of code 120. The control circuit 40, which corresponds to the interpretation section, replaces the data words arranged in sequence in the arrangement positions of the code area with the corresponding positions in the other type of code 120 using the correspondence information (the arrangement conversion table), and then interprets the other type of code 120, in cases where the determination section determines that the cells at the predetermined positions 105 are formatted in a designated format configuration, As described, it is possible to produce the information code 100 with the code area which includes the regions other than the data recording region, error-correction-code recording region, and the specification pattern regions. In particular, the free space 110 will not be subjected to the error correction. Hence, it is not necessary to set error correction codes for this free space 110, thus providing an efficient and effective error correction to the data in the data recording region.

Moreover, if the information code producing apparatus 2 includes the data acquisition device acquiring data being interpreted, the arrangement-position information recording device (which records arrangement position information necessary for specifying arrangement positions in the code area when the plural data words expressing the data being interpreted are arranged in the code area), and the free space 110 formed in the code area, the apparatus 2 further includes the data-recording region producing device producing a data recording region. This producing device produces the data recording region such that the format information is recorded at the predetermined positions in the code area in a specified format configuration and the respective data words expressing the data being interpreted are arranged depending on the arrangement position information.

Meanwhile, the information code reader 10 includes the correspondence information recording device, the determination device, and the interpretation device. The correspondence information recording device records correspondence information which corresponds to the arrangement position information recorded in the arrangement-position information recording section and is used to specify arrangement positions of plural data words in the code area. The determination device determines whether or not the predetermined positions of the code area are configured to show a predetermined format configuration in cases where the imaging unit captures the imaging code 100. Further the interpretation device interprets specify the positions of the data words in the code area using the correspondence information corroded in the correspondence information recording section, and interprets the data being interpreted.

In this case, in the information code reader 10, the determination device confirms the format configurations at the predetermined positions 105, whereby the reader can determine whether or not an information code produced by the information code producing unit 2 is a specific information code 100 (i.e., the information code 100 with the free space 110). If it is determined that the format configurations are specific, the data words in the code area can be specified in their positions in the code area, based on the correspondence information, leading to interpreting the data.

Moreover, the information code producing apparatus 2 includes the data-recording region producing device which configures cell arrangements at the predetermined positions 105 when the free space 110 is produced in the code area. In this case, the cells are arranged to be masked using a predetermined type of mask pattern. Additionally, responsively to imaging the information code 100 using the imaging unit, the information code reader 10 includes the determination device which can determine whether or not the predetermined positions 105 are masked by the predetermined mask pattern, and if being masked, the interpretation device of the reader 10 interprets data being interpreted.

Hence, in this configuration, depending on the type of a mask pattern applied at the predetermined positions 105, it can be determined reliably whether or not there is provided a specific information code 100 (provided with the free space 100) produced by the information code producing apparatus 2. This results in lesser amount of data for the format information, while still easily obtaining a specified format configuration.

In this embodiment, the arrangement position information (i.e., the correspondence information) is provided to define correspondence, one by one, between sequential data words expressed by converting data being interpreted to a plurality of data words and arrangement positions of the sequential data words in the code area. Concretely, the arrangement position information is set such that the sequential data words expressed by the arrangement positions in the code area define correspondent positions in the other type of code 120 in cases this code 120 different from the information code 100 is used for the expression. When the determination device determines the specific format configuration applied at the predetermined positions, the interpretation device interprets the other type of code 120 under a condition that the data words sequentially expressed by the arrangement positions in the code area are converted, through the correspondence information, to the correspondent positions in the other type of code 120. As a result, the reading scheme for the other type of code 120 can be used to read the specific information code 100 (which is an information code provided with the free space 110).

Second Embodiment

A second embodiment will now be described.

A system which uses an information code according to the second embodiment employs the hardware configuration which is the same as that in the first embodiment, so that the foregoing configurations shown FIGS. 1 and 2 are still be used in the second embodiment.

In the system using the information code in the second embodiment, the information code producing apparatus 2 (refer to FIG. 1 etc.) produces an information code 200 as shown in FIG. 11(B). The code area includes in a specification pattern region in which predetermined-shape specification patterns 204 are arranged, and a data recording region in which data are recorded by a plurality of types of cells. Additionally, at a position other than the specification pattern regions inside the code area, a free space 210 is arranged using a method different from a method for recording data in the data recording region. At least one of data recording or design display can be allowed in the free space 210. This free space 210 has a size larger in area than a single unit cell.

In this example, the remaining parts except for the free space 210 are configured as a known QR code (registered trademark). As shown in FIG. 11(A), the code area includes the specification pattern regions, the data recording region, and an error-correction code recording region in which error correction codes are recorded by the plurality of cells. In this example, recording methods used for recording both data code words in the data recording region and error correction code words into the error-correction code recording region are identical to those for a known QR code (registered trademark). For instance, the methods standardized by JISX0510 are used to position for arranging the position detecting patterns 204, data code words in the data recording region, and error-correction code words in the error-correction code recording region.

In this example, however, as shown in FIG. 11(A), there is produced an information code 200' in which the code words of part of the region is expressed by only white cells and the free space 210 is formed as a region expressed by only the while cells. And as shown in FIG. 11(B), inside the free space 210, a design composed figures, patterns, dues or a combination of those factors, or/and, bits of information expressed by one or more symbols are displayed. In the case shown in FIG. 11(B) in which a design D is displayed in the free space 210, which is different from the original code presentation shown in FIG. 11(A). However, the data in the free space 210 can still be subjected to known error correction performed using the error correction codes recorded in the error-correction code recording region.

In the information code 200 in FIG. 11(B), the free space 210 is positionally specified in advance. Thus, in cases where a design and/or bits of information is added and displayed in the free space 210, a position at which an error has been caused due to this display can be known previously. It is therefore possible to configure error correction codes in the error-correction code recording region in such a manner that disappearance correction of the data is performed under an assumption that error positions are known by the position of the free space 210. Information showing the position of the free space 210 can previously be recorded in the data recording region, or stored in the reader 10 (refer to FIG. 1), whereby the reader 10 can specify the position of the free space 210 (i.e., positions of data code words which have caused errors) when reading. The reader 10 is thus able to correct loss of data based on the recorded error correction codes, so that the errors of the data code words present in the free space 210, of which position has been specified, are corrected.

Additionally, of the data to be recorded in the data recording region, data (i.e., objet data outputted) mapped before a terminator showing the end of data being interpreted may be arranged outside the free space 210 and a region following the terminator, which is mapped with pad code words (data which are not interpreted), may be assigned to the free space 210. In this example, by way of example, the region with the pad code words is all displayed by only the white cells.

Third Embodiment

A third embodiment will now be described.

A system which uses an information code according to the third embodiment employs the hardware configuration which is the same as that in the first embodiment, so that the foregoing configurations shown FIGS. 1 and 2 are still be used in the third embodiment.

In the system using the information code according to the third embodiment, the information code producing apparatus 2 (refer to FIG. 1 etc.) is configured to produce an information code 300 as shown in FIG. 12(B). In this configuration, the code area includes a specification pattern region and a data recording region mapped with data using a plurality of types of cells. In the specification pattern region, predetermined-shape specification patterns include an L-shaped alignment pattern 304a and timing cells 304b occupying an L-shaped region extending along outer boundaries of the code area. In the timing cells, light cells and dark cells are aligned alternately one by one. Additionally, at a position other than the specification pattern regions inside the code area, a free space 310 is arranged using a method different from a method for recording data in the data recording region. At least one of data recording or design display can be allowed in the free space 310. This free space 310 has a size larger in area than a single unit cell.

In this example, the remaining regions other the free space 310 are formed as a known DataMatrix code. As shown in FIG. 12(A), the code area includes a specification pattern region, a data recording region, and an error-correction code recording region with error correction codes mapped by plurality of types of cells. In this example, recording methods used for recording both data code words in the data recording region and error correction code words into the error-correction code recording region are identical to those for a known DataMatrix code. For instance, the alignment pattern 304a and the timing cells 304b, data code words in the data recording region, and error correction code words in the error-correction code recording region are arranged according to standards provided by version ECC200.

In this example, however, as shown in FIG. 12(A), there is produced an information code 300' in which the code words of part of the region is expressed by only white cells and the free space 210 is formed as a region expressed by only the while cells. And as shown in FIG. 12(B), inside the free space 310, a design composed figures, patterns, dues or a combination of those factors, or/and, bits of information expressed by one or more symbols are displayed. In the case shown in FIG. 12(B) in which a design D is displayed in the free space 310, which is different from the original code presentation shown in FIG. 12(A). However, the data in the free space 310 can still be subjected to known error correction performed using the error correction codes recorded in the error-correction code recording region.

In the information code 300 in FIG. 12(B), the free space 310 is positionally specified in advance. Thus, in cases where a design and/or bits of information is added and displayed in the free space 310 and the error position due to the display can be known previously. It is therefore possible to configure error correction codes in the error-correction code recording region in such a manner that disappearance correction of the data is performed under an assumption that error positions are known by the position of the free space 310. Information showing the position of the free space 310 can previously be recorded in the data recording region, or stored in the reader 10 (refer to FIG. 1), whereby the reader 10 can specify the position of the free space 310 (i.e., positions of data code words which have caused errors) when reading. The reader 10 is thus able to correct disappearance of data based on the recorded error correction codes, so that the errors of the data code words present in the free space 310, of which position has been specified, are corrected.

Other Embodiments

The present invention will not be limited to the embodiments described above, and the following embodiments will still be construed within a gist of the present invention.

The present invention can be practiced as a display apparatus capable displaying one, plural or all of the information codes described in the foregoing embodiments. Similarly the present invention can be practiced as a printing apparatus capable of printing at least one of the foregoing embodiments. Additionally the present invention can be applied to a computer-readable program which enables a computer to produce at least one of the foregoing information codes. As a similar manner to the foregoing, the present invention can be practiced as a recording medium in which the foregoing computer-readable program is stored. As a further category of the present invention, there can be provided an information code medium on which at least one of the foregoing information codes are arranged. Such an information code medium may be a code carrier produced by a printing technique or a direct marking technique for example. Another further aspect of the invention may be realized as images in which at least one of the foregoing information codes are displayed.

An alternative to the configurations shown in FIG. 1 and other drawings is to provide the information code producing apparatus 2 in the information code reader 10, though both of the information code producing apparatus 2 and the information code reader 10 are provided separately from each other in FIG. 1 for instance.

Although the foregoing embodiments have been exemplified as the codes provided with the code area 110 in their central parts, the free space 110 may not be limited to being located in such arrangements. By way of example, the code area can be formed closer to edges thereof, not in the central part. The free space may be blank as shown in FIG. 10(A), may be designed as shown in FIGS. 10(A) and (B), or may be presented with bits of information composed of one or more symbols. Alternatively, designs can be displayed in the free space together with bits of information. Still alternatively, the free space may be presented with various other designs which differ from a pattern shown in FIG. 10(B) and/or a figure shown in FIG. 10(C), as long as the design is composed of figures, patterns, or colors or a combination thereof. Moreover, when presenting bits of information instead of the design in the design or in cases where bits of information are pretended with a design in the free space, various types of information can be employed. For example, the information can be provided as names of a body (business owner or individual) who supplying data to be recorded in the information code 100 and/or a site address managed by such body, or names of goods and/or services concerning with data to be recorded in the information code 100.

In the foregoing embodiments, the other type of code has been exemplified as a QR code and the specification patterns used by the information code 100 are explained as the specification patterns for QR codes, but other types of information codes may be adopted. One example is that the other type of code is a DataMatrix code and the specification patterns used by the information code 100 are specification patterns used in the DataMatrix code.

Figure 7:
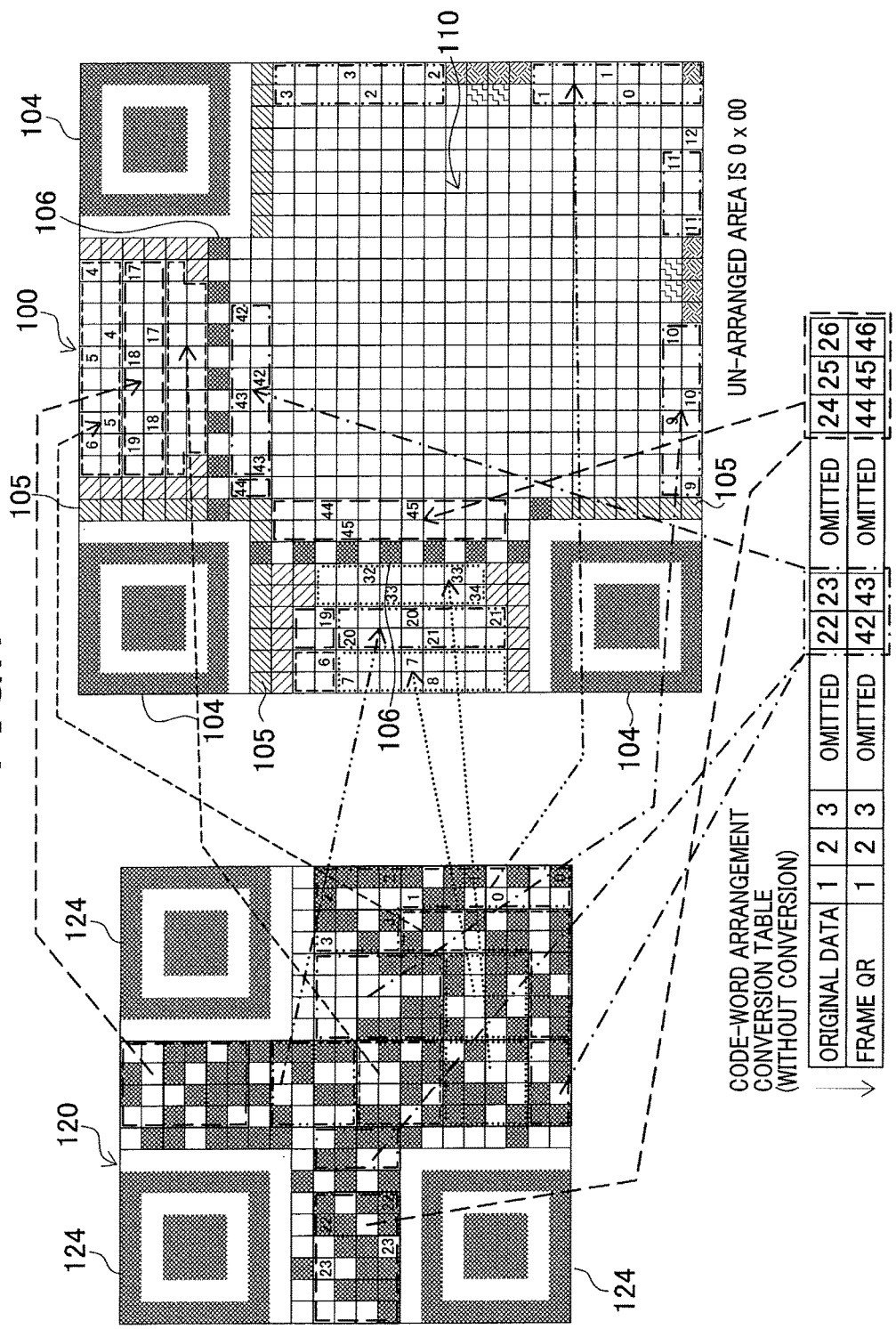
FIG. 7 is an illustration explaining a correspondence relationship between arrangement of respective data words in the information code produced by an information code producing apparatus composing part of the system using the information code shown in FIG. 1, the correspondence relationship being different from that shown in FIG. 5.

The correspondence relationship provided in the arrangement conversion table shown in FIG. 5 can also be altered arbitrarily as shown in FIG. 7. For example, if the conversion table is changed as shown in FIG. 7 from that shown in FIG. 5, the information code producing apparatus 2 and the information code reader 10 produces and reads an information code 100, in which arrangements of the 22-th to 26-th code words are changed, so that a produced free space 110 is also changed in its position and shape. Concretely, the arrangements of the 22-th to 26-th code words are from those shown in the right figure in FIG. 5 (in which such code words are recorded at the 22-th to 26-th arrangement candidate positions) to those shown in the right figure in FIG. 7 (such code words are recorded at the 42-th to 26-th arrangement candidate positions). In other words, according to this modified example, changing or adjusting contents of the arrangement conversion table makes it possible to change or adjust the position and/or shape of the free space 110 to be produced, thus raising the degree of freedom of designing free spaces.

REFERENCE SIGN LIST

1 . . . system which uses an information code
2 . . . information code producing apparatus
3 . . . controller (data acquiring device, data-recording region producing device)
4 . . . operation unit (data acquiring device)
5 . . . memory (arrangement-position information recording section)
7 . . . communication device (data acquiring device)
10 . . . information code reader
23 . . . imaging unit)
35 . . . memory (correspondence information recording section)
40 . . . control circuit (interpretation device, determination device)
100,200,300 . . . information code
102,202,302 . . . cell
104,204 . . . (specification pattern)
304a . . . (specification pattern)
304b . . . (specification pattern)
110,210,310 . . . free space (AR)
120 . . . QR code serving as another type of code
R . . . object being read (medium)
REG . . . code area

What is claimed is:

1. A method of producing an information code by an information code producing apparatus, the method comprising:
arranging, in a code area of a medium, a specification pattern region in which predetermined-shape specification patterns are arranged, the specification patterns including patterns indicating a position of the code area;
arranging, in the code area, a data recording region and an error correction code recording region, wherein coded data is recorded in the data recording region by a plurality of types of cells, the cells are arranged in a predetermined code area of the medium, the cells function as a unit of information, and error correction codes are recorded in the error correction code recording region by the plurality of types of cells;
arranging a free space at a position located outside the specification pattern region in the code area, the free space having a size larger in area than a single cell, the free space being excluded from error correction being performed using the error correction codes, the free space being arranged using a method which is different from a method of recording the data into the data recording region such that at least one of recording data other than the cells and displaying a design being allowed in the free space, the design being given independently of the cells arranged in the data recording region; and
recording format information of the code at predetermined positions in the code area in a specified format configuration, the predetermined positions being outside of the free space.

2. The method of claim 1, wherein
the free space is arranged at a position located outside the specification pattern region, the data recording region, and the error correction code recording region in the code area.

3. The method of claim 1, comprising:
using an arrangement-position information recording section in which arrangement position information is recorded to specify arrangement positions in the code area, a plurality of data words being arranged at the arrangement positions, the data words expressing object data being interpreted, the object data being to be recorded in the data recording region, and
arranging the plurality of data words in the code area according to the arrangement position information recorded in the arrangement-position information recording section.

4. The method of claim 1, wherein, in arranging the free space in the code area, an arrangement of the cells is configured in the code area such that a predetermined type of mask pattern is reflected in the arrangement of cells.

5. The method of claim 1, comprising: displaying, in the free space, at least one of a design and information, the design being a figure, a pattern, a hue or a combination thereof, the information being expressed by one or more symbols.

6. An information code formed on a medium, wherein
a specification pattern region is arranged in a code area, predetermined-shape specification patterns are arranged in the specification pattern region, the specification patterns including patterns indicating a position of the code area;
a data recording region is arranged in the code region, coded data being recorded in the data recording region by a plurality of types of cells, the cells being arranged in a predetermined code area of the medium, the cells functioning as a unit of information;

an error correction code recording region is arranged in the code area, error correction codes being recorded in the error correction code recoding region by the plurality of types of cells;

a free space is arranged at a position located outside the specification pattern region in the code area, the free space having a size larger in area than the single cell, the free space being excluded from error correction being performed using the error correction codes, the free space being arranged using a method which is different from a method of recording the data into the data recording region such that at least one of recording data other than the cells and displaying a design is allowed in the free space, the design being given independently of the cells arranged in the data recording region; and format information of the code is recorded at predetermined positions in the code region in a specified format configuration, the predetermined positions being outside the free space.

7. The information code of claim 6, wherein the free space is arranged at a position located outside the specification pattern region, the data recording region, and the error correction code recording region in the code area.

8. The information code of claim 6, wherein data words expressing object data to be interpreted in the data recording region are arranged in the code area based on predetermined arrangement position information.

9. The information code of claim 8, wherein an arrangement of cells is configured in the predetermined position in the code area such that a predetermined type of mask pattern is reflected in the arrangement of cells.

10. The information code of claim 6, wherein in the free space, at least one of a design and information is displayed, the design being a figure, a pattern, a hue or a combination thereof, the information being expressed by one or more symbols.

11. An information code reader configured to read an information code provided on a medium, cells being arranged in a predetermined code area of the medium, the cells functioning as a unit of information, wherein the information code comprises:

a specification pattern region arranged in the code area, predetermined-shape specification patterns being arranged in the specification pattern region, the specification patterns including patterns indicating a position of the code area;

a data recording region arranged in the code region, coded data being recorded in the data recording region by a plurality of types of cells, the cells being arranged in a predetermined code area of a medium, the cells functioning as a unit of information;

an error correction code recording region arranged in the code region, error correction codes being recorded in the error correction code recoding region by the plurality of types of cells;

a free space arranged at a position located outside the specification pattern region in the code area, the free space having a size larger in area than a single cell, the free space being excluded from error correction being performed using the error correction codes, the free space being arranged using a method which is different from a method of recording the data into the data recording region such that at least one of recording data other than the cells and displaying a design is allowed in the free space, the design being given independently of the cells arranged in the data recording region; and format information of the code recorded at predetermined positions in the code area in a specified format configuration, the predetermined positions being outside the free space, and the information code reader comprises:
an imaging unit that images the information code; and
an interpreter that interprets the data recorded in the data recording region, based on contents recorded in the data recording region, when the information code is imaged by the imaging unit.

12. The information code reader of claim 11, wherein the free space is arranged at a position located outside the specification pattern region, the data recording region, and the error correction code recording region in the code area.

13. The information code reader of claim 11, wherein the information code includes data words expressing object data being interpreted in the data recording region arranged in the code area based on ii-specified arrangement position information, the information code reader further comprises:
a correspondence information recording device that records correspondence information corresponding to the arrangement position information and specifying arrangement positions of the plurality of data words in the code area; and
a determination device that determines whether or not the predetermined positions of the code area are formatted in the specified format configuration when the imaging unit images the information code, and the interpretation device is configured to specify positions of the data words in the code area based on the correspondence information recorded in the correspondence information recording region when the determination device determines that the predetermined positions have the specified format configuration, and interpret the object data being interpreted.

14. The information code reader of claim 13, wherein the information code is configured such that cell arrangements at the predetermined positions are subjected to masking with a predetermined type of mask pattern;

the determination device is configured to determine whether or not the predetermined positions are subjected to masking with the predetermined type of mask pattern when the imaging unit images the information code; and the interpretation device is configured to interpret the object data being interpreted provided that that the predetermined positions are subjected to masking with the predetermined type of mask pattern.

15. The information code reader of claim 13, wherein the arrangement position information defines correspondence between the sequential data words produced when the object data being interpreted are expressed by the data words and the arrangement positions of the sequential data words in the code area;

the correspondence information defines correspondent positions of the sequential data words in another type of code when the sequential data words are expressed by the other type of code which differs in type from the information code; and the interpretation device is configured to interpret the other type of code in a state where the sequential data words are replaced with the correspondent positions in the other type of code, the correspondent positions being defined using the correspondence information, when the determination device determines that the predetermined positions have the specified format configuration.

16. A system which uses an information code, the system comprising:
an information code producing apparatus that produces an information code on a medium; and
an information code reader that reads the information code produced by the information code producing apparatus, wherein
the information code producing apparatus is configured to produce the information code such that the information code comprises:
a specification pattern region arranged in a code area of the medium, predetermined-shape specification patterns being arranged in the specification pattern region, the specification patterns including patterns indicating a position of the code area;
a data recording region arranged in the code area, coded data being recorded in the data recording region by a plurality of types of cells, the cells being arranged in a predetermined code area of the medium, the cells functioning as a unit of information;
an error correction code recording region is arranged in the code region, error correction codes being recorded in the error correction code recoding region by the plurality of types of cells;
a free space arranged at a position located outside the specification pattern region in the code area, the free space having a size larger in area than a single cell, the free space being excluded from error correction being performed using the error correction codes, the free space being arranged using a method which is different from a method of recording the data into the data recording region such that at least one of recording data other than the cells and displaying a design is allowed in the free space, the design being given independently of the cells arranged in the data recording region; and
format information of the code is recorded at predetermined positions in the code area in a specified format configuration, the predetermined positions being outside the free space, and
the information code reader comprises an imaging unit that images the information code produced by the information code producing apparatus, and
the information code reader is configured to interpret the data recorded in the data recording region based on contents of the data recording region, when the imaging unit images the information code.

17. The system of claim 16, wherein the information code producing apparatus is configured to produce the information code such that:
the free space is arranged at a position located outside the specification pattern region, the data recording region, and the error correction code recording region in the code area.

18. The system of claim 16, wherein
the information code producing apparatus comprises:
a data acquiring device acquiring object data being interpreted;
an arrangement-positions information recording device recording arrangement position information necessary for specifying arrangement positions in the code area, a plurality of code words expressing the object data being arranged at the arrangement positions; and
a data-recording region producing device producing the data recording region, such that, when the free space is formed inside the code area, data words expressing the object data are arranged based on the arrangement position information recorded in the arrangement-position information recording region, and
the information code reader comprises:
a correspondence information recording device recording correspondence information corresponding to the arrangement position information and specifying arrangement positions of the plurality of data words in the code area;
a determination device determining whether or not the predetermined positions of the code area are formatted in the specified format configuration when the imaging unit images the information code; and
an interpretation device specifying positions of the data words in the code area based on the correspondence information recorded in the correspondence information recording region when the determination device determines that the predetermined positions have the specified format configuration, and interpreting the object data.

19. The system of claim 18, wherein
the data-recording region producing device is configured to the cell arrangements at the predetermined positions such that the predetermined positions are subject to a masking with a predetermined type of mask pattern when the free space is formed in the code area;
the determination device is configured to determine whether or not the predetermined positions are subjected to masking with the predetermined type of mask pattern when the imaging unit images the information code; and
the interpretation device is configured to interpret the object data provided that that the predetermined positions are subjected to masking with the predetermined type of mask pattern.

20. The system of claim 18, wherein
the arrangement position information defines correspondence between the sequential data words produced when the object data are expressed by the data words and the arrangement positions of the sequential data words in the code area;
the correspondence information defines correspondent positions of the sequential data words in another type of code when the sequential data words are expressed by the other type of code which differs in type from the information code; and
the interpretation device is configured to interpret the other type of code in a state where the sequential data words are replaced with the correspondent positions in the other type of code, the correspondent positions being defined using the correspondence information, when the determination device determines that the predetermined positions have the specified format configuration.

21. The system of claim 16, wherein the information code producing apparatus is configured to produce the information code such that in the free space, at least one of a design and information is displayed, the design being a figure, a pattern, a hue or a combination thereof, the information being expressed by one or more symbols.

* * * * *